United States Patent
Boas et al.

(10) Patent No.: US 7,333,647 B2
(45) Date of Patent: Feb. 19, 2008

(54) SYSTEMS AND METHOD FOR GENERATING AN IMAGE

(75) Inventors: David A. Boas, New Market, NH (US); Quan Zhang, Somerville, MA (US); Ang Li, Somerville, MA (US)

(73) Assignee: The General Hospital Corporation, Boston, MA (US)

( * ) Notice: Subject to any disclaimer, the term of this patent is extended or adjusted under 35 U.S.C. 154(b) by 637 days.

(21) Appl. No.: 10/406,751

(22) Filed: Apr. 3, 2003

(65) Prior Publication Data

US 2003/0190066 A1    Oct. 9, 2003

Related U.S. Application Data

(60) Provisional application No. 60/370,521, filed on Apr. 5, 2002.

(51) Int. Cl.
G06K 9/00    (2006.01)

(52) U.S. Cl. ............. 382/131; 382/274; 378/98.4

(58) Field of Classification Search ........... 382/128, 382/129, 130, 131, 132, 133, 134, 169, 170–172, 382/194, 219, 260, 274, 276, 321; 359/298; 378/98.4; 250/582; 600/420, 443; 345/593
See application file for complete search history.

(56) References Cited

U.S. PATENT DOCUMENTS

| | | | | |
|---|---|---|---|---|
| 5,473,736 A * | 12/1995 | Young | ............. | 345/593 |
| 5,699,798 A * | 12/1997 | Hochman et al. | ............. | 600/420 |
| 5,960,058 A * | 9/1999 | Baba et al. | ............. | 378/98.4 |
| 6,264,610 B1 * | 7/2001 | Zhu | ............. | 600/443 |
| 6,310,967 B1 * | 10/2001 | Heine et al. | ............. | 382/128 |
| 6,717,174 B2 * | 4/2004 | Karellas | ............. | 250/582 |
| 7,072,096 B2 * | 7/2006 | Holman et al. | ............. | 359/298 |
| 2002/0039453 A1 | 4/2002 | Naiki et al. | | |

FOREIGN PATENT DOCUMENTS

| DE | 4209376 | 9/1993 |
|---|---|---|
| EP | 0370322 | 5/1990 |

\* cited by examiner

*Primary Examiner*—Seyed Azarian
(74) *Attorney, Agent, or Firm*—Dorsey & Whitney LLP

(57) ABSTRACT

A system for obtaining a resultant image and a method to utilize the same are provided. In particular, first and second images of a subject or a portion of the subject are obtained. The first image includes a first portion of the subject and a second portion of the subject, and each of the first image and the second image are different types of images. A first probability that the first portion has a contrast which is greater than a predetermined contrast and a second probability that the second portion has a contrast which is greater than the predetermined contrast then is determined using the second image. For example, the second probability is greater than the first probability. Moreover, the first and second portions of the first image are reconstructed to generate the resultant image. Specifically, the first portion is reconstructed based on the first probability and the second portion is reconstructed based on the second probability.

47 Claims, 25 Drawing Sheets

Without constraint
$\alpha_1 = \alpha_2 = 0.7$

With constraint
$\alpha_1 = 0.7; \alpha_2 = 0.04$

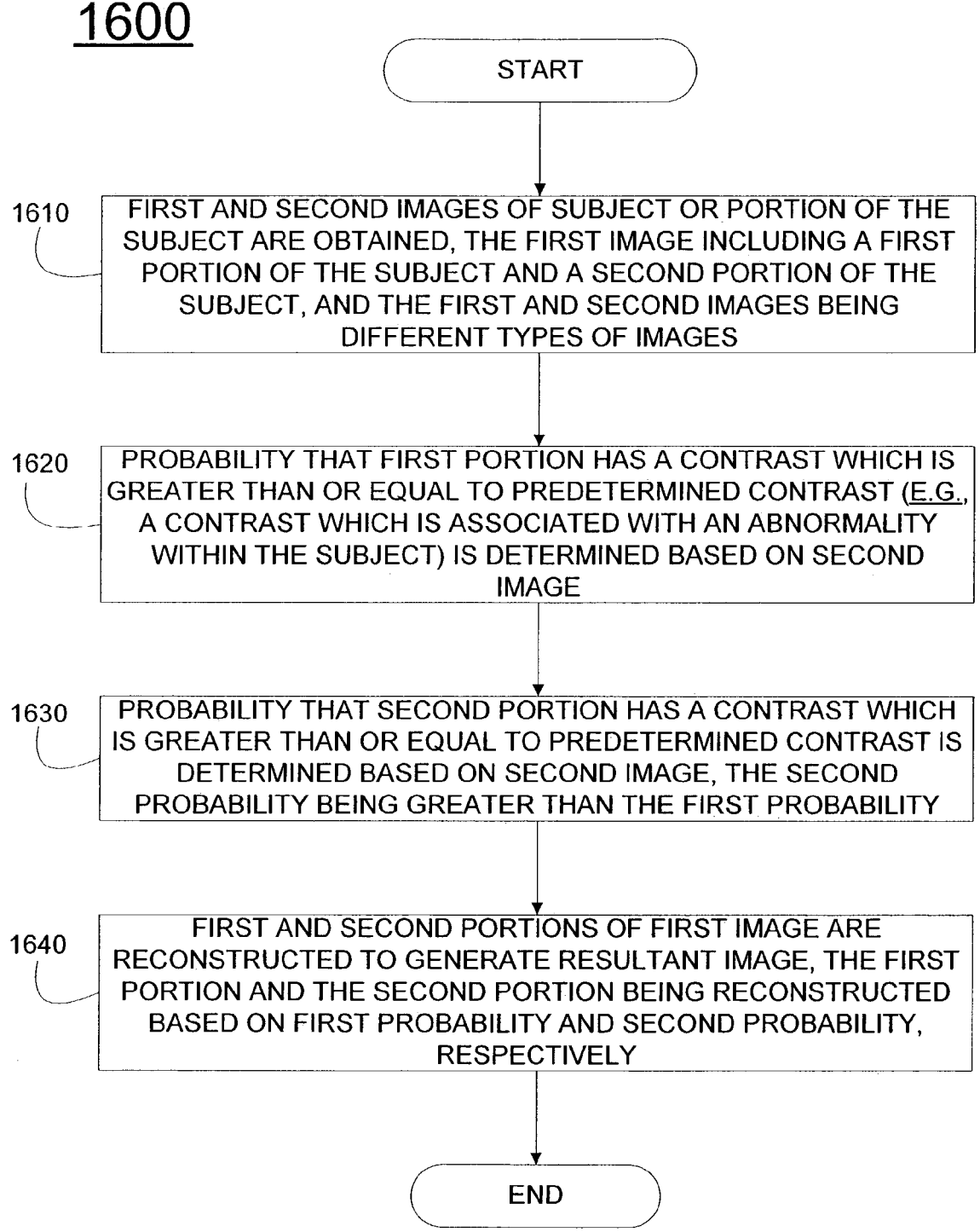

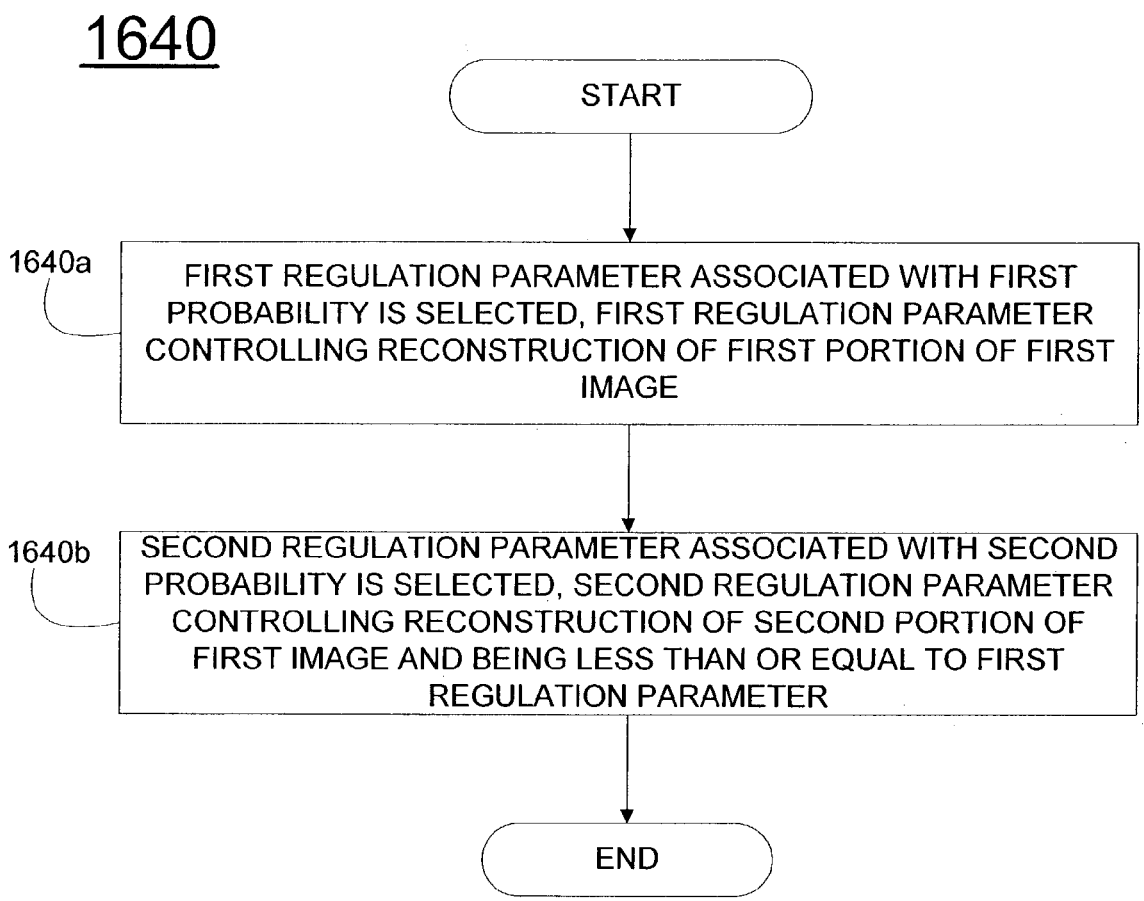

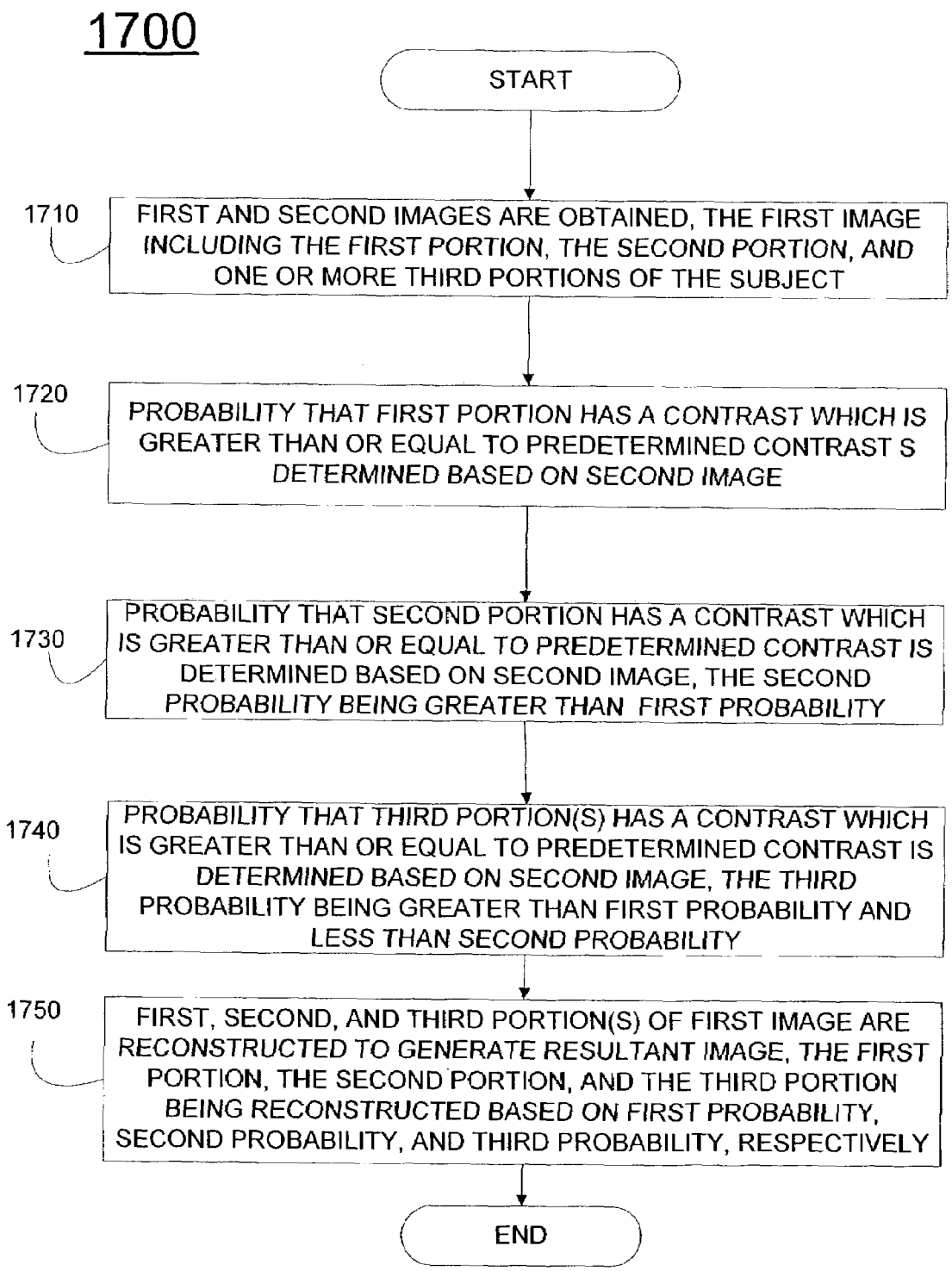

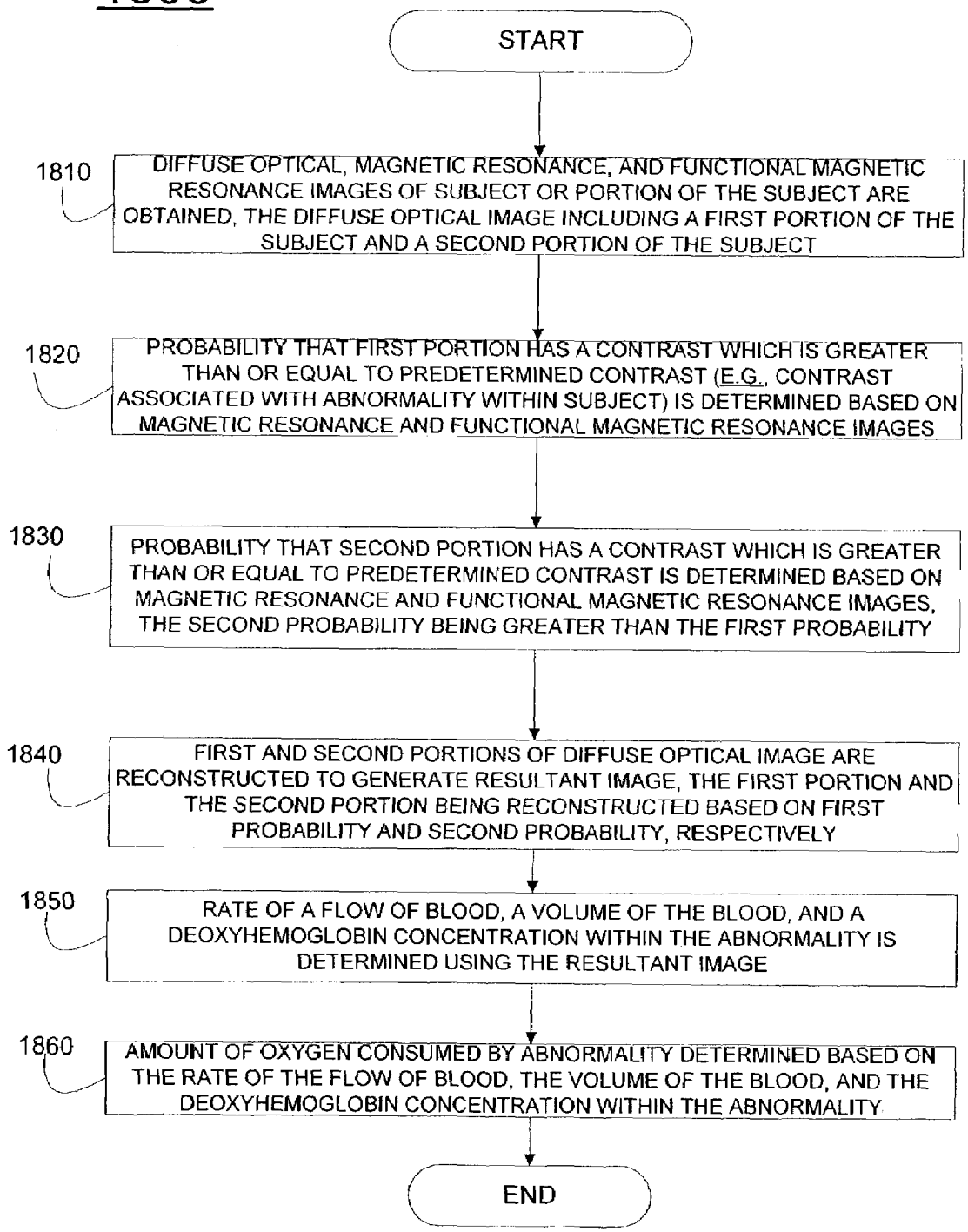

US 7,333,647 B2

SYSTEMS AND METHOD FOR GENERATING AN IMAGE

CROSS-REFERENCE TO RELATED APPLICATION

The present application claims priority from U.S. Provisional Patent Application No. 60/370,521, entitled "System and Process for Previously-Obtained 2-Dimensional or 3-Dimensional Spatial Information for Diffuse Optical Imaging," filed Apr. 5, 2002, the entire disclosure of which is incorporated herein by reference in its entirety.

STATEMENT REGARDING FEDERALLY SPONSORED RESEARCH

The invention was made with the U.S. Government support under Grant No. DAMD17-99-2-9001 awarded by the U.S. Department of the Army. Thus, the U.S. Government has certain rights in the invention.

FIELD OF THE INVENTION

The present invention relates generally to a system and method for generating an image. In particular, the present invention is directed to a system and method in which first and second images of a subject or a portion of the subject are obtained (e.g., simultaneously or sequentially), and the first image is reconstructed based on the second image to generate a resultant image having a spatial resolution which is greater than a spatial resolution of the first image.

BACKGROUND OF THE INVENTION

The development of Diffuse Optical Tomography ("DOT") for obtaining three-dimensional images of spatially varying absorption and scattering properties of a highly scattered media probed by near infrared light has been rapidly advancing. The clinical application of the DOT techniques to imaging breast cancer and brain pathology has shown increased promise. This is the case along with the appearance of preliminary results indicating the feasibility of extracting physiologically relevant information from the images reconstructed from the diffuse optical measurements. Because the inverse imaging problem for the DOT is ill-conditioned and generally under-determined, the image quality may likely suffer from poor spatial resolution and a sensitivity to measurement noise. This image quality can be improved by optimizing the geometry and the number of measurements being performed. However, significant improvements using such techniques may likely be obtained only by including previously-obtained information into the image reconstruction.

The use of a hard structural constraint provided by Magnetic Resonance Imaging ("MRI") and Ultrasound Imaging ("UI") techniques to reconstruct the optical diffuse image is known. In these conventional approaches, three-dimensional spatial information for different structures within the highly scattered medium are identified by the MRI or UI techniques, and a previously obtained optical diffuse image is reconstructed based on the MRI/UI image to obtain a resultant image. Specifically, it can be assumed that the boundaries of the structures identified by the MRI/UI technique also serve as the boundaries for piece-wise continuous structures within the diffuse optical image. Given these hard structural constraints, the DOT problem is then reduced to characterizing the optical properties within the specified target structures. Nevertheless, because the correlation between an MRI/UI contrast and a DOT contrast has not been explored, the validity of the assumption in the hard constraint has remained unclear.

SUMMARY OF THE INVENTION

Therefore, a need has arisen to provide a system and method for generating an image which overcome the above-described and other shortcomings of the related art.

According to an exemplary embodiment of the present invention, a system and method for generating the resultant image are provided. Specifically, each of a first image (e.g., an optical diffuse image) and a second image (e.g., an X-ray image, a magnetic resonance image, a functional magnetic resonance image, a computed tomography image, an ultrasound image, etc.) of a subject (e.g., a human, an animal, etc.) or a portion of the subject is obtained. For example, the first and the second images may be simultaneously or sequentially obtained. The first image includes a first portion of the subject and a second portion of the subject. Moreover, the second image is used to determine a first probability indicating that the first portion has a contrast which is greater than or equal to a predetermined contrast (e.g., a contrast associated with an abnormality within the subject, such as a tumor, a lesion, etc.). The second image is also used to determine a second probability indicating that the second portion has a contrast which is greater than or equal to the predetermined contrast, and the second probability is greater than the first probability, i.e., it is more likely that the second portion of the first image includes the abnormality. For example, the first probability may be about 0% and the second probability may be about 100%. Moreover, the first and second probabilities are used to reconstruct the first image, thereby generating the resultant image. Specifically, the first portion is reconstructed based on the first probability to generate a reconstructed first portion of the resultant image, and the second portion is reconstructed based on the second probability to generate a reconstructed second portion of the resultant image. Moreover, the system and method may reconstruct the first image based on the first probability and the second probability to generate the resultant image, thus increasing spatial resolution of the resultant image relative to the spatial resolution of the conventional resultant image. In this manner, spatial information from the second image may be used as a soft constraint on the first image to generate the resultant image.

In a variant of this embodiment of the present invention, the first image can also include a third portion of the subject (e.g., the third portion can separate the first portion from the second portion). For example, the third portion can be an outer edge of the abnormality within the subject, and may be subdivided into a plurality of third portions. In this exemplary variant, the second image can also be used to determine a third probability indicating that the third portion has a contrast which is greater than or equal to the predetermined contrast. For example, the third probability may be less than the second probability and greater than the first probability. In another exemplary embodiment, the third portion can be subdivided into a plurality of third portions, and each of the third portions may have a different third probability. In addition, each of the third probabilities may be less than the second probability and greater than the first probability, and may be used to blur the outer edges of the abnormality in the resultant image.

For example, when a distance between a particular point within the first image and a center of the abnormality is less than or equal to a first predetermined distance, the probability that the particular point includes the abnormality may be 100%. In a further exemplary embodiment, the second portion of the first image may include all or substantially all of these particular points, and the second probability may be 100%. When the distance between an intermediate point within the first image and the center of the abnormality is greater than the first predetermined distance but is less than or equal to a second predetermined distance, the probability that the particular point includes the abnormality may be greater than 0% but less than 100%.

In yet another exemplary embodiment of the present invention, the third portion of the first image may include all or substantially all of these intermediate points within the first image, and the third probability may be greater than 0% but less than 100%. For example, the third portion may include the outer edge of the abnormality, and the third probability associated with each of the intermediate points within the third portion may vary depending on the location of the intermediate point within the third portion. The intermediate points which are closest to the center of the abnormality may have an associated third probability equal to 100%–X %, where X is a percentage greater than 0% but less than 50%, and the intermediate points which are closest to the outer edge of the abnormality may have an associated third probability equal to 0%+X %. Moreover, the intermediate points which are positioned between the intermediate points closest to the center of the abnormality and the intermediate points closest to the outer edge may have an associated third probability which is greater than 0%+X % but less than 100%–X %, depending on their exact location within the third portion. When a distance between a further point within the first image and the center of the abnormality is greater than the first and second predetermined distances, the probability that the further point includes the abnormality may be 0%. In a variant of the exemplary embodiment of the present invention, the first portion of the first image may include all or substantially all of these further points, and the first probability may be 0%.

In still another exemplary embodiment of the present invention, one or more first regulation parameters associated with the first probability may be selected. For example, the first regulation parameter(s) may be associated with an optical absorption of the first portion of the first image, and/or an optical scattering of the first portion of the first image. Similarly, one or more second regulation parameters associated with the second probability may be selected. For example, the second regulation parameter(s) may be associated with an optical absorption of the second portion of the first image, and/or an optical scattering of the second portion of the first image.

In particular, the first regulation parameter(s) may control the reconstruction of the first portion, the second regulation parameter(s) can control the reconstruction of the second portion, and the second regulation parameter may be less than or equal to the first regulation parameter. For example, a normalized value of the first regulation parameter(s) may be between about 0.1 and about 1, and a normalized value of the second regulation parameter(s) can be greater than zero and less than or equal to about 0.1. The normalized value for the first regulation parameter(s) may be selected using a L-curve procedure. Moreover, after the normalized value for the first regulation parameter(s) is selected, the normalized value for the second regulation parameter(s) may be selected by balancing two inversely related factors. The first factor may be the resolution of the reconstructed second portion of the resultant image, and the second factor can be an amount of noise generated in the reconstructed second portion of the resultant image. For example, increasing the second regulation parameter(s) decreases the amount of noise generated in the reconstructed second portion, and also decreases the resolution of the reconstructed second portion. Similarly, decreasing the second regulation parameter(s) increases the resolution of the reconstructed second portion, and also increases the amount of noise generated in the reconstructed second portion. By balancing these two factors, an optimum normalized value for second regulation parameter(s) may be selected.

According to a particular exemplary embodiment of the present invention, another system and method for generating the resultant image are provided. For example, an optical diffuse image, a magnetic resonance image, and a functional magnetic resonance image of the subject or a portion of the subject is obtained. The first image includes a first portion of the subject and a second portion of the subject. Moreover, the second image and the third image are used to determine the first probability that the first portion has a contrast which is greater than or equal to the predetermined contrast. The second image and the third image are also used to determine the second probability that the second portion has a contrast which is greater than or equal to the predetermined contrast, and the second probability is greater than the first probability. Moreover, the first and second probabilities may be used to reconstruct the first image, thereby generating the resultant image. Specifically, the first portion can be reconstructed based on the first probability to generate the reconstructed first portion of the resultant image, and the second portion can be reconstructed based on the second probability to generate the reconstructed second portion of the resultant image.

In this exemplary embodiment, the first regulation parameter(s) associated with the first probability may be selected e.g., using the L-curve procedure. Similarly, the second regulation parameter(s) associated with the second probability may be selected, e.g., by balancing the two inversely related factors to select the optimum normalized value for the second regulation parameter(s). After the resultant image is generated, the resultant image then may be used to determine each of a rate of a flow of blood within the abnormality, a volume of the blood within the abnormality, and a deoxyhemoglobin concentration within the abnormality. Based on the information related to the flow of the blood, the volume of the blood, and the deoxyhemoglobin concentration within the abnormality, an amount of oxygen consumed by the abnormality may then be determined.

Other objects, features, and advantage will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

FIG. 16A is a flowchart of a second exemplary embodiment of the method according to the present invention for generating the resultant image.

FIG. 16B is a flowchart of a variant of the method of FIG. 16A.

FIG. 17 is a flowchart of a third exemplary embodiment of the method according to the present invention for generating the resultant image.

FIG. 18 is a flowchart of a fourth exemplary embodiment of the method according to the present invention for generating the resultant image.

DETAILED DESCRIPTION

Figure 1:
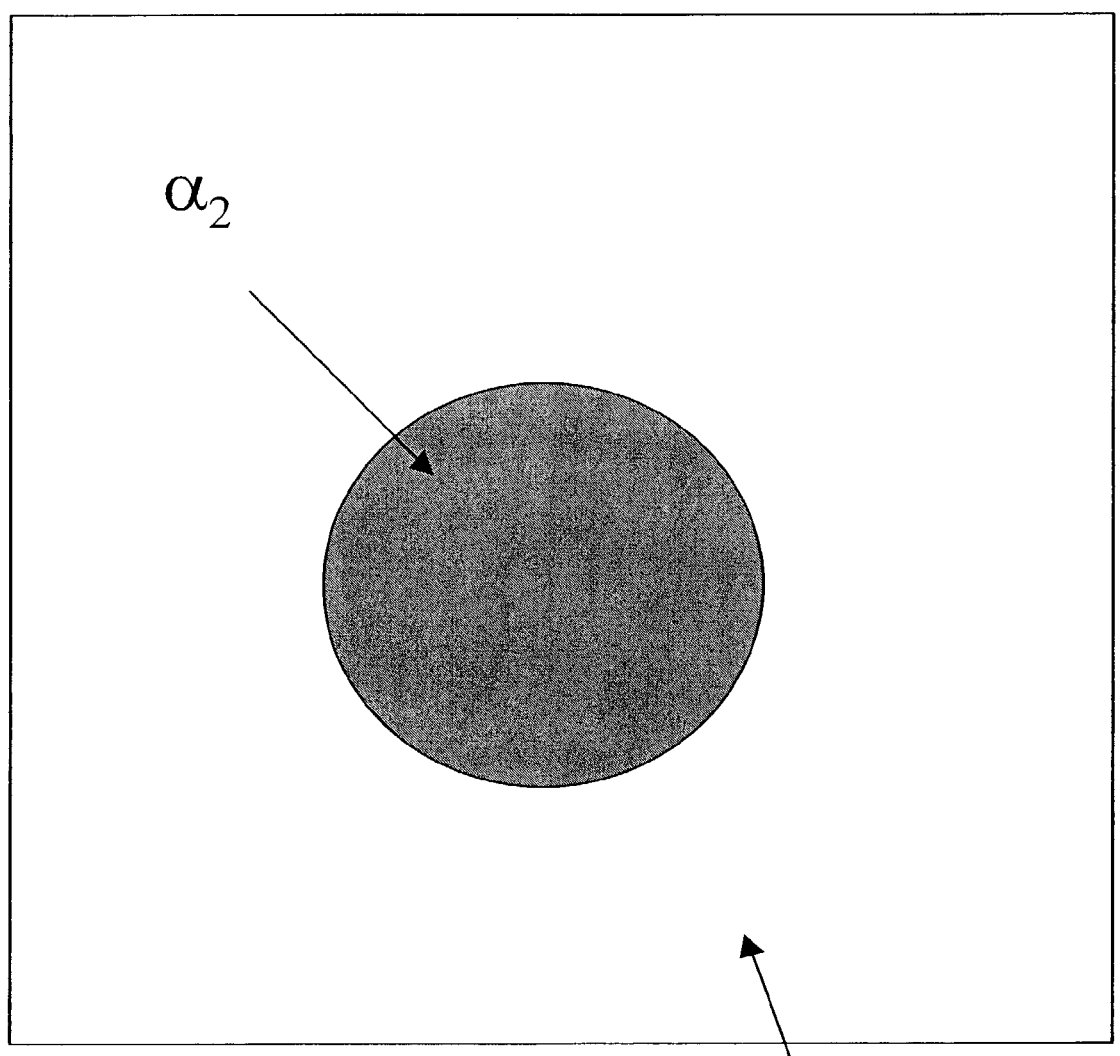
FIG. 1 is an exemplary representative illustration of a spatially-variant regulation parameter which can be used for a formulation of an exemplary embodiment of a system and method according to the present invention.

Embodiments of the present invention and their features and advantages may be understood by referring to FIGS. 1-18, like numerals being used for like corresponding parts in the various drawings.

I. General Discussion a. Theory

Generally, according to the present invention, each of a first image (e.g., an optical diffuse image) and a second image (e.g., an X-ray image, a magnetic resonance image, a functional magnetic resonance image, a computed tomography image, an ultrasound image, etc.) of a subject (e.g., a human, an animal, etc.) or a portion of the subject can be obtained, e.g., simultaneously or sequentially. Information included in the second image may then be used to provide soft constraints which are used to reconstruct the first image. In this example, the first image may be a three-dimensional diffuse optical image, and the second image can be a two-dimensional X-ray image. Moreover, the soft-constraints from the two-dimensional X-ray image can be incorporated into the Diffuse Optical Tomography ("DOT") problem through the minimization of an objective function:

$$F(x)=(\Phi_m-\Phi_t(x))^T \cdot (\Phi_m-\Phi_t(x))+\lambda_a(P_a x-\gamma)^T \cdot (P_a x-\gamma)+\lambda_s(P_s x-\gamma)^T \cdot (P_s x-\gamma).$$

This equation has the following exemplary terms: (a) the residual between an optical measurement and a theoretical estimate of the optical measurement, and (b) a difference between a projection of the three-dimensional diffuse optical absorption/scattering image and the two-dimensional X-ray image. The unknown "x" is a vector of an absorption coefficient $\mu_a'$ and a reduced scattering coefficient $\mu_s'$ at each voxel within the medium. Thus, the length of such "x" vector is identified as $2N_{vox}$, where $N_{vox}$ is the number of voxels within the medium to be imaged. The measurements of the diffuse photon fluence are defined by the vector $\Phi_m$, where each element represents a measurement with a different source-detector pair. The theoretical estimate of the measured photon fluence is provided by $\Phi_t(x)$, e.g., a function of the optical properties within the medium. A pair of regularization parameters for controlling a correlation between the absorption (scattering) image and the X-ray image is given by $\lambda_a$ ($\lambda_s$). The normalized two-dimensional X-ray image is given by the vector $\gamma$, such that the sum of all elements equals to one.

The projection of the three-dimensional absorption, and the reduced scattering onto the two-dimensional X-ray image can be handled by $P_a$ and $P_s$, respectively, as defined herein. $P_a$ is defined as the projection of the three-dimensional absorption image onto a two-dimensional image that is co-registered with the two-dimensional X-ray image, and $P_s$ is defined as the projection of the three-dimensional scattering image onto the two-dimensional image that is co-registered with the two-dimensional X-ray image. These projection operators also normalize the result such that the sum of the elements of $P_a x$ and the sum of the elements of $P_s x$ equal to one. Such normalization allows the X-ray image to be used as a structural guide for the diffuse optical image, without placing any constraint on the magnitude of the diffuse optical image, without assuming a linearity between the X-ray and DOT contrast. By separating the constraint on the absorption and scattering, it is possible to tune the details of the correlation expected with the two-dimensional X-ray image. It should be understood that a soft structural constraint is being formulated on the three-dimensional diffuse optical image from a two-dimensional X-ray image, whereas the conventional systems and processes used hard three-dimensional structural constraints. The formulation presented in the equation above can be modified to handle a soft structural constraint from a three-dimensional image obtained from X-ray, magnetic resonance, functional magnetic resonance, computed tomography, ultrasound, etc.

For the case of fewer measurements than the unknowns, the linear problem is likely to be underdetermined, and can be defined by a regularized Moore-Penrose generalized inverse function:

$$\Delta x = B^T (BB^T + \lambda_{tik} I)^{-1} y,$$

where I is the identity matrix, and $\lambda_{tik}$ is the Tikhonov regularization parameter. The matrix B can be defined as:

$$B = [A(\lambda_a P_a)(\lambda_a P_a)]^T,$$

where the matrix A is the linear transformation relating the change in the optical properties of the medium represented by $\Delta x$ to the change in the optical measurements, as known in the art.

The matrices $P_a$ and $P_s$ can sparse, and may project and normalize the three-dimensional diffuse optical absorption and scattering image, respectively, into a two-dimensional image in the plane of the X-ray image. Thus, each row of $P_a$ and $P_s$ preferably represents an X-ray pixel, and each column represents an absorption or scattering voxel. Thus, each such element is zero if the voxel is not projected into the pixel; otherwise it is $1/N_a$ or $1/N_s$ for $P_a$ and $P_s$, respectively, where $N_a$ ($N_s$) equals the sum of $\mu_a$ ($\mu_s'$) over all voxels. For $P_a$, all scattering voxels are preferably not projected into the pixel, and therefore all of those columns can be equal to zero, which may be the case for $P_s$. The vector y contains the diffuse optical and X-ray measurements, e.g., $$y = [\eta \gamma]^T,$$

where $\eta_i = \ln[\Phi_{m,i}/\Phi_{o,i}]$ and $\Phi_{o,i}$ is a background photon fluence that may be measured without any perturbation in the optical properties. Each element of $\gamma$ can be the value of a pixel in the normalized X-ray image.

In a second example, a Born approximation of the diffusion equation as the forward model of light propagating through tissue, and a modified Tiknov regularization for the inverse problem may be used. In this example, the soft-constraint of x-ray image can be incorporated into the DOT problem through the minimization of a cost function $\phi$:

$$\phi = \|y - A \cdot f\|^2 + \alpha_1 \|(I - S) \cdot f\|^2 + \alpha_2 \|S \cdot f\|^2$$

Such cost function has three separate terms: (i) a residual between the optical measurement and the theoretical estimate of the measurement, (ii) a norm of the part of image that doesn't have a X-ray contrast, and (iii) a norm of the part of image that has a X-ray contrast. f is defined as the optical image to be reconstructed. A is defined as the weight matrix calculated using three-point Green function of the diffuse approximation. y is defined as the data set. I is defined as the identity matrix. S is a diagonal two-value matrix with x-ray contrast information, e.g., a binary matrix when the subject is divided into two portions or a normalized matrix when the subject is divided into three or more portions. The solution of the minimization of the cost function $\phi$ (is as follows:

$$f = y^T \cdot A \cdot [A^T \cdot A + I \cdot \alpha(\vec{r})]^{-1}$$

where $\alpha(r)$ is a spatially variant regularization parameter, which is allowed to vary spatially within the pixels of the image, (which has a two-value function). In particular, $\alpha_2$ can be assigned a small value (e.g., less than about 0.1) so we can increase the interested area's contrast and resolution. FIG. 1 shows an exemplary representative illustration 10 of such spatially variant regulation parameter which can be used by exemplary embodiments of a system and method according to the present invention. When such increase takes place, the high frequency noise inside of the interested area may also increase. Therefore, as set forth in detail below, the spatial resolution of the reconstructed image may be compared to the amount of noise inside the interested area of the reconstructed image when selecting optimum regularization parameters.

b. Testing Theory Via Simulation i. THE FIRST EXAMPLE

Figure 2A:
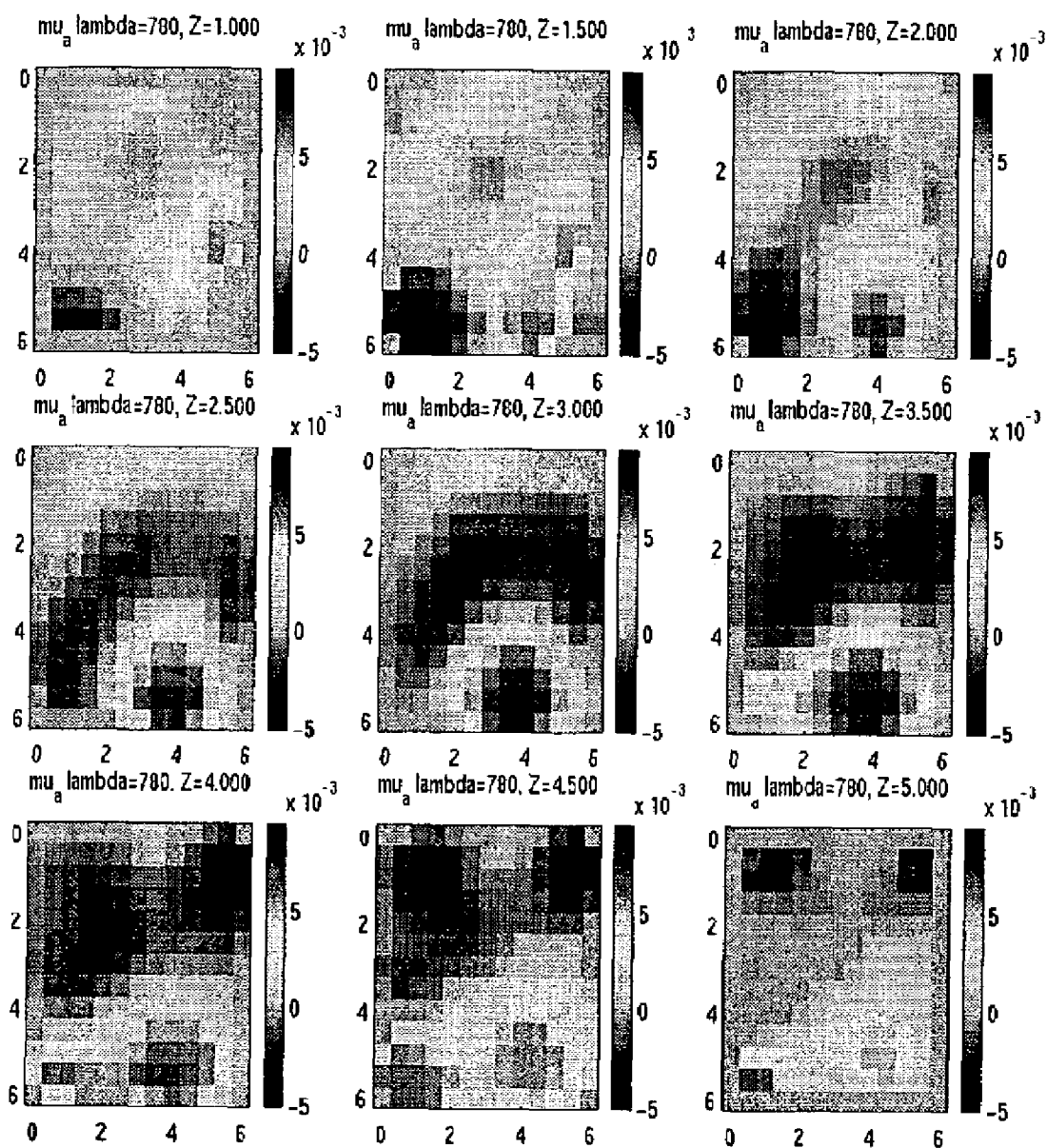
FIG. 2A is an illustration of a slab representation of a clinical breast measurement for an absorption image without the use of a soft spatial constraint.
Figure 2B:
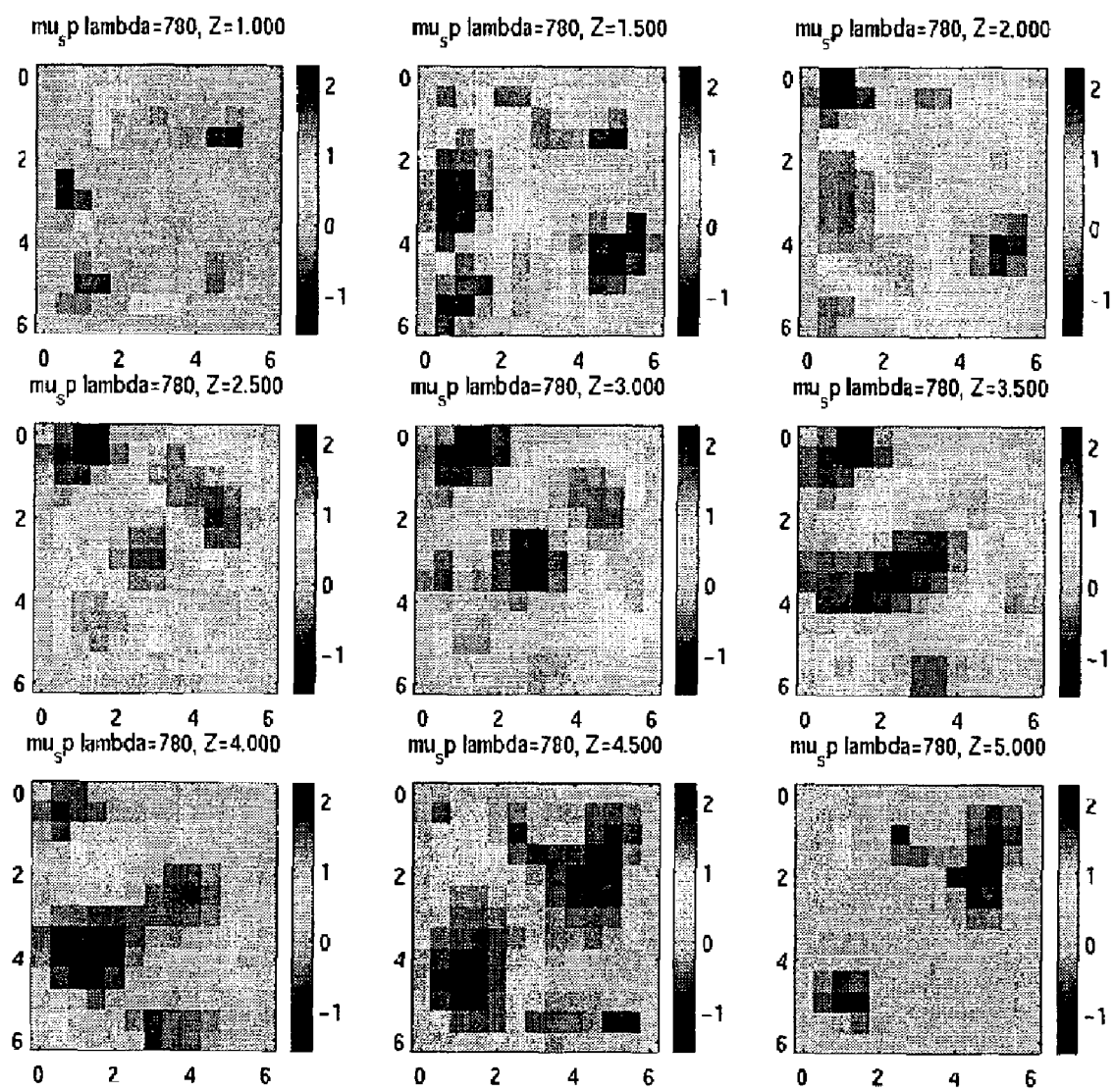
FIG. 2B is an illustration of the slab representation of the clinical breast measurement for a scattering image without the use of the soft spatial constraint.
Figure 3A:
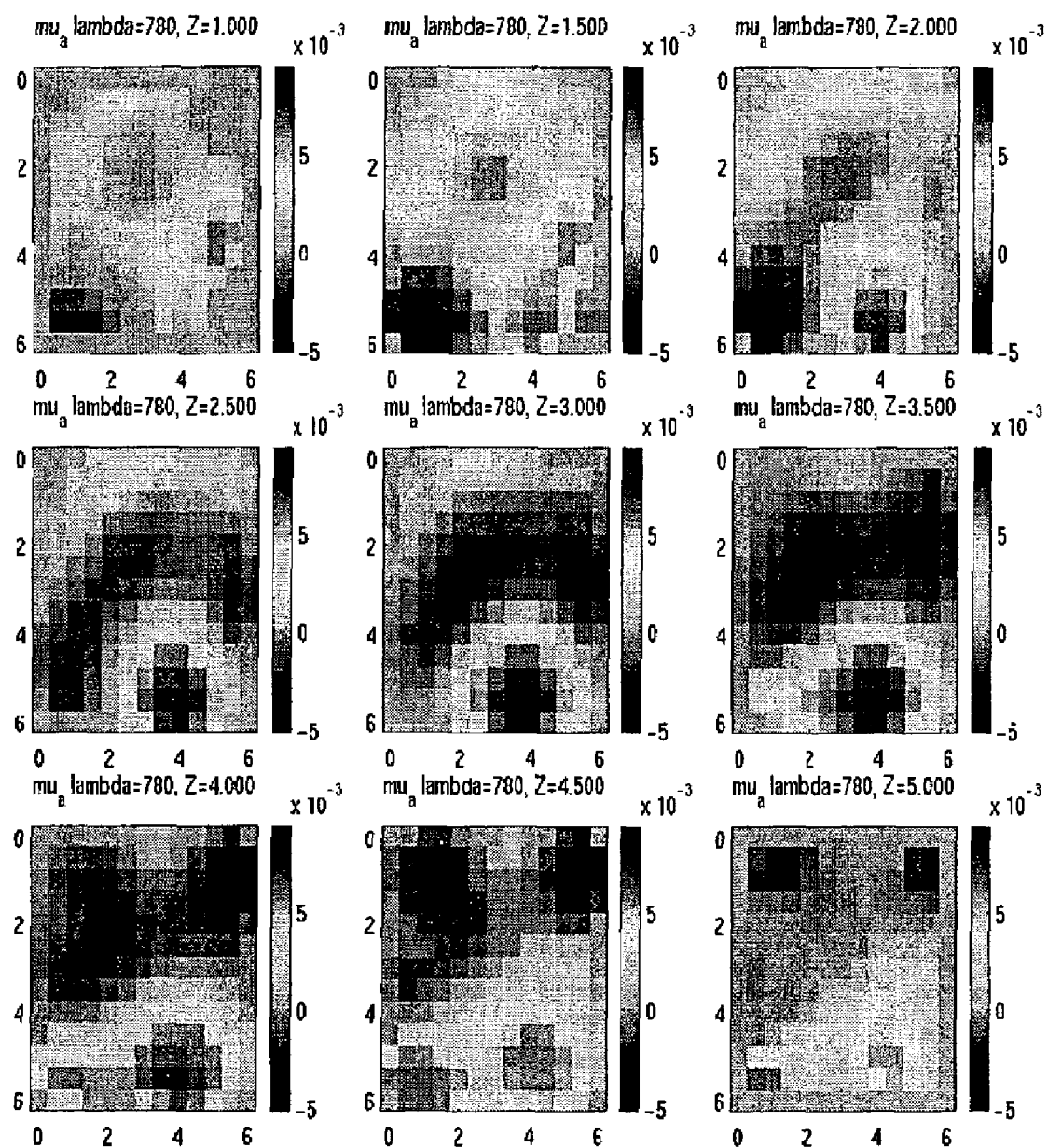
FIG. 3A is an illustration of the slab representation of the clinical breast measurement for the absorption image in which the soft spatial constraint is utilized.
Figure 3B:
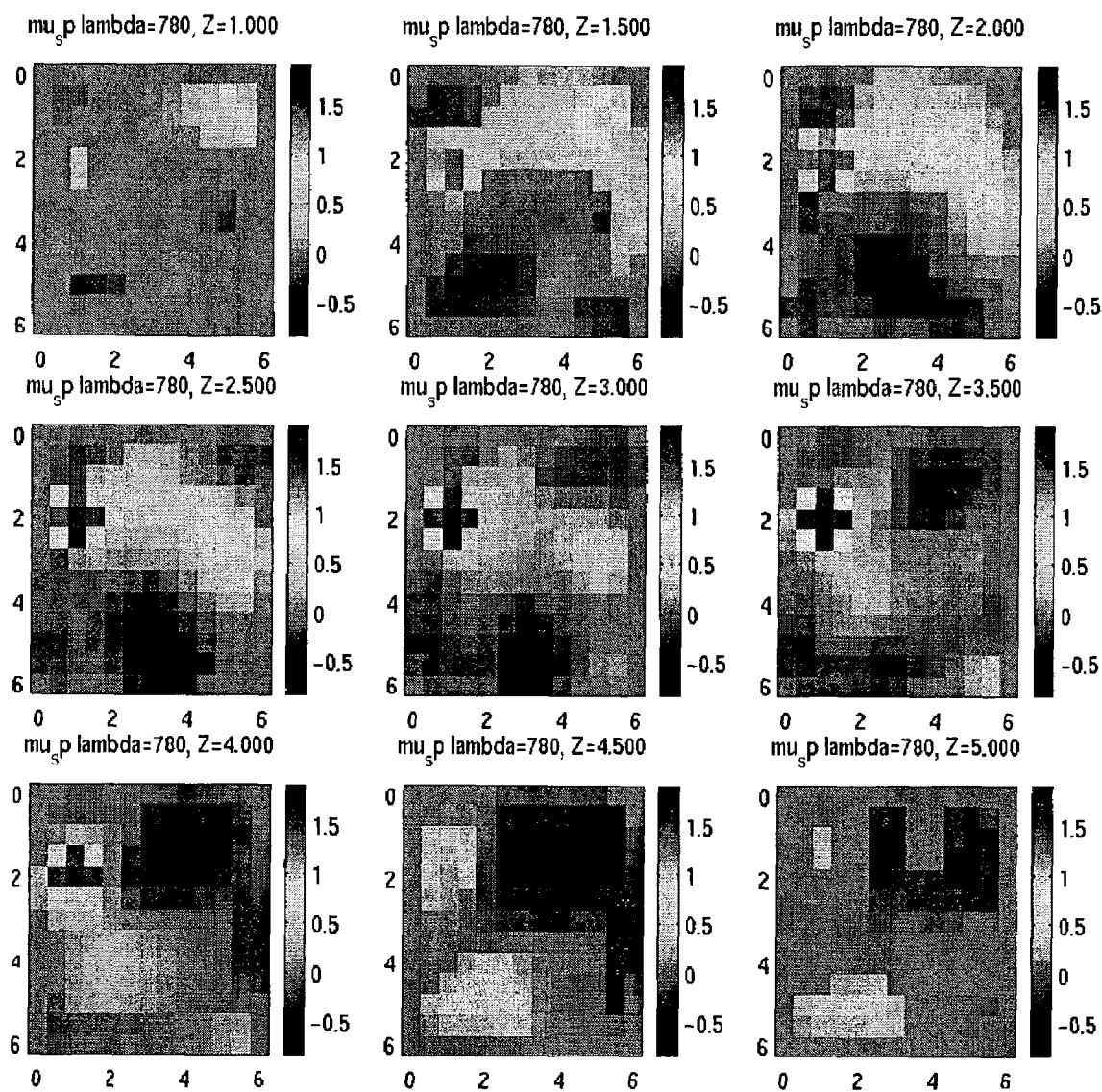
FIG. 3B is an illustration of the slab representation of the clinical breast measurement for the scattering image in which the soft spatial constraint is utilized.

A transmission measurement can be simulated via a slab representative of a clinical breast measurement. In the exemplary simulation, sixteen optical sources and sixteen optical detectors spanning 6×6 cm can be used to image two lesions, one lesion with contrast in the absorption coefficient and the other with contrast in the scattering coefficient. Realistic noise may be added to the simulated measurements. The results of the image reconstruction in this example, without the use of the spatial constraint, is shown in FIG. 2A for the absorption image, and in FIG. 2B for the scattering image. As shown in these illustrations, the images are dominated by the image noise because the soft spatial constraint is not utilized. This image noise can significantly be reduced by applying the spatial constraint, thus allowing the two lesions to be more accurately characterized, as shown in FIG. 3A for the absorption image, and in FIG. 3B for the scattering image.

ii. THE SECOND EXAMPLE

Figure 4A:
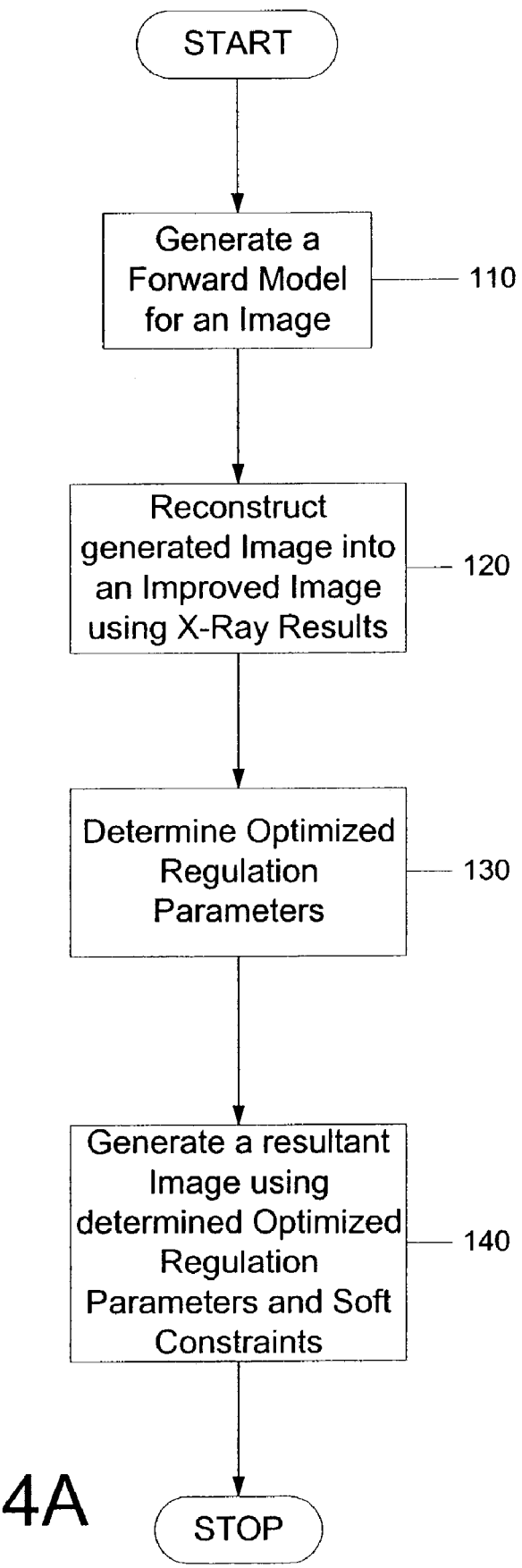
FIG. 4A is a flowchart of a first exemplary embodiment of the method according to the present invention for generating a resultant image.
Figure 4B:
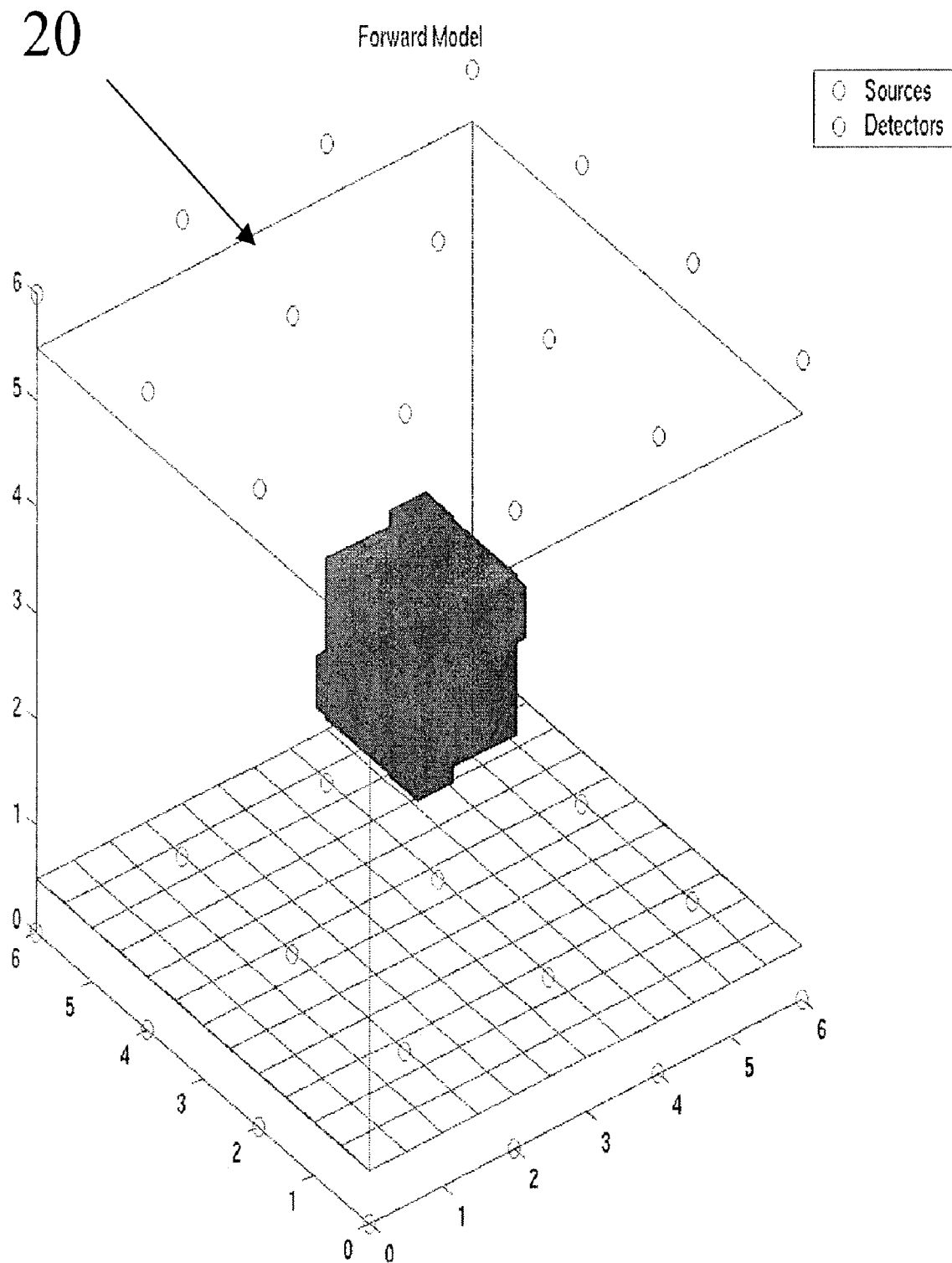
FIG. 4B is an illustration of a forward model used for testing and implementation of the method of FIG. 4A.

As shown in FIG. 4B, a forward model representing a homogeneous medium 20 can be generated for testing and implementation of the concepts of the second example. This generation step (i.e., step 110) is illustrated in a flow diagram of a first exemplary embodiment of the method of the present invention shown in FIG. 4A. In particular, an exemplary wave length of 780 μm, a modulation frequency of 200 megahertz can be selected. A background optical property can be set as follows: $\mu_a = 0.05$ cm$^{-1}$ and $\mu_s = 5$ cm$^{-1}$. A spherical heterogeneity with radius of 1 cm and the optical property of $\mu_a$ 0.1 cm$^{-1}$ can be placed in the center of the homogeneous medium. The Gaussian type of noise can also added to the data so that the signal to noise ratio may be approximately 20~40 dB.

Figure 5A:
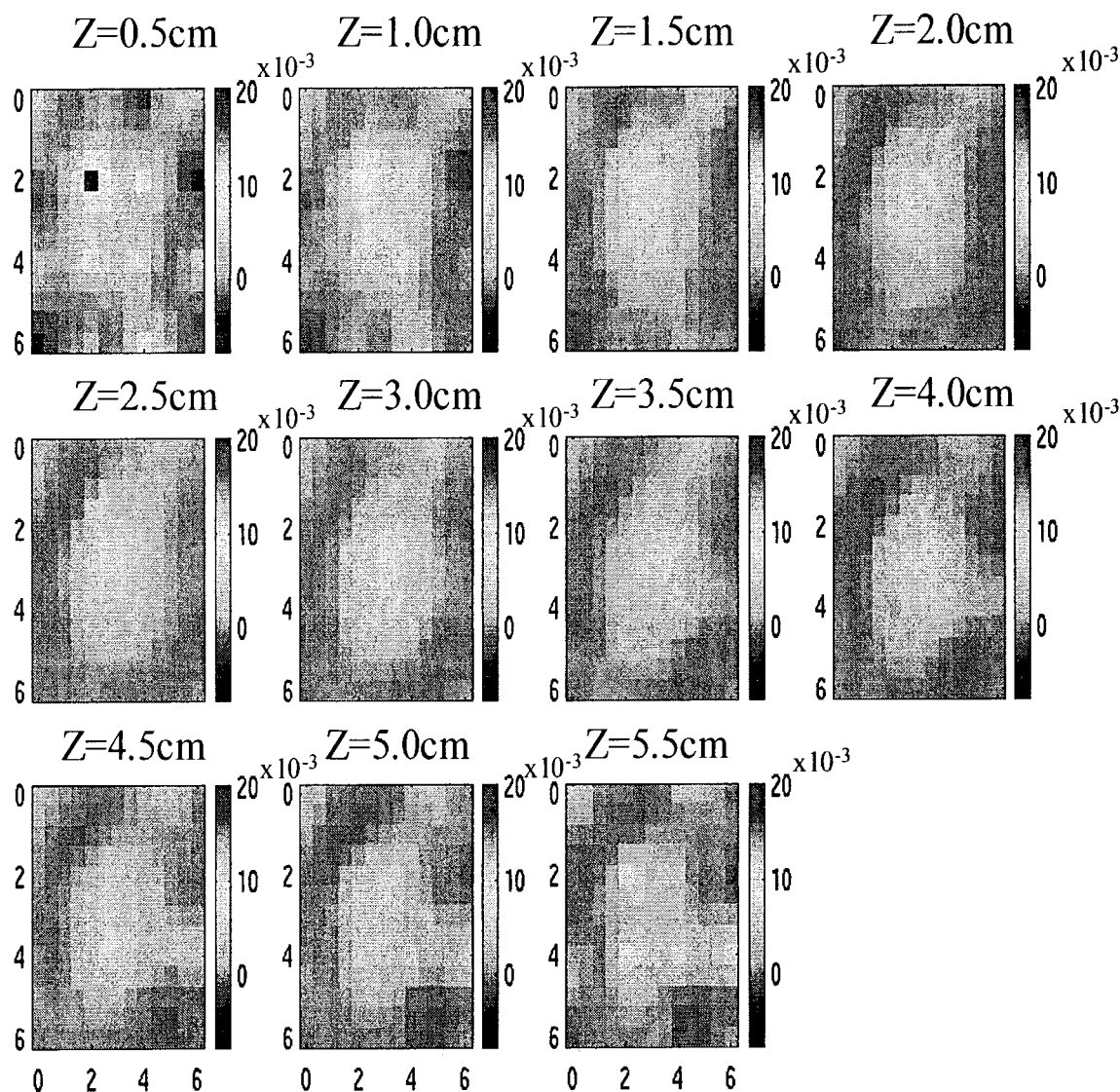
FIG. 5A is an image providing the results of a reconstruction procedure which do not use x-ray constraints.
Figure 5B:
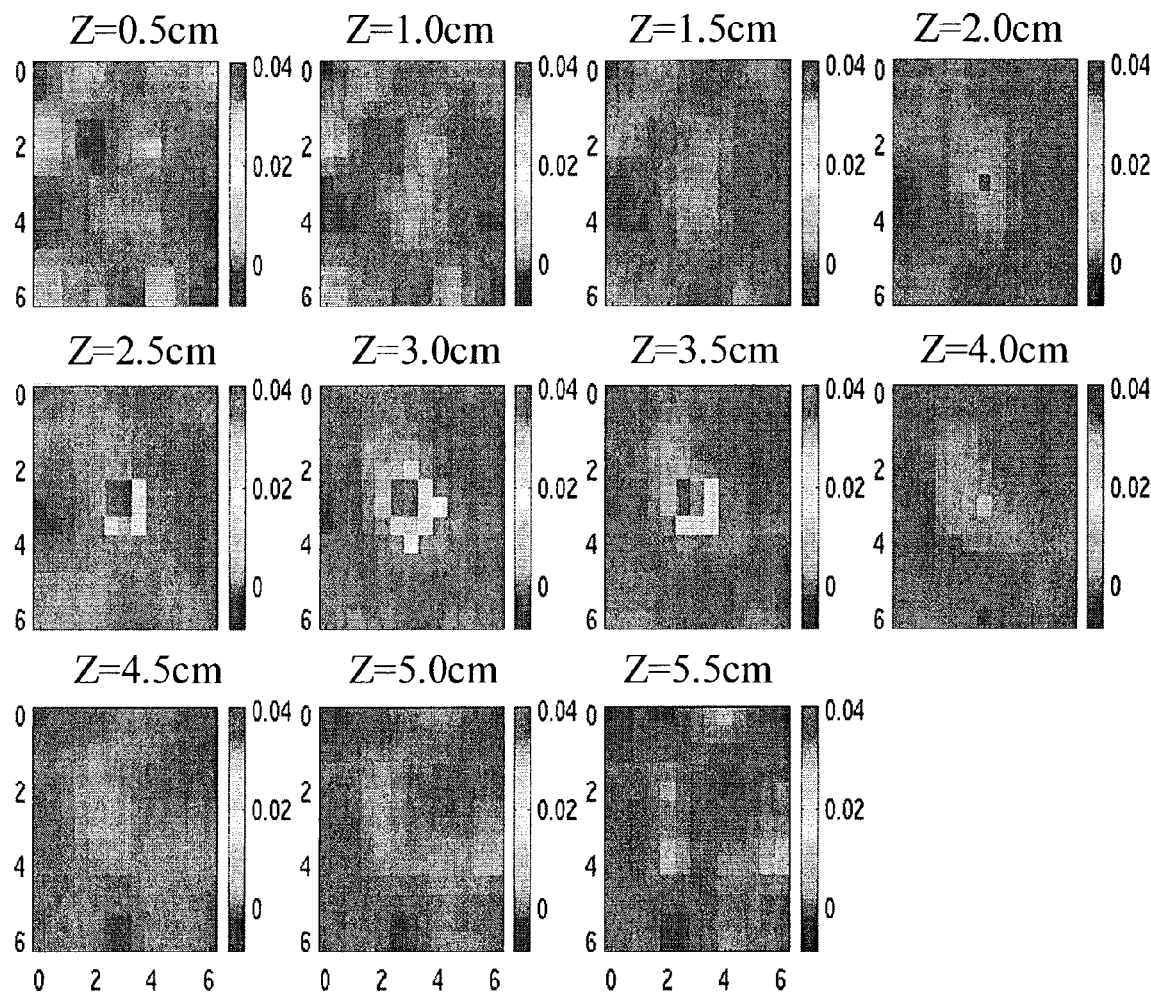
FIG. 5B is an image providing the results of a reconstruction procedure which utilize the x-ray constraints.

Thereafter, a reconstruction procedure can be performed on the image of the homogeneous medium using x-ray constraints to obtain improved images, as provided in step 120 of FIG. 4A. FIG. 5A shows the image providing the results of the reconstruction procedure of FIG. 4A which do not use the x-ray constraints. This exemplary image can be compared with the improved image results, as shown in FIG. 5B, in which the image was reconstructed using such x-ray constraints. Both of these drawings illustrate the images extending along the Z-direction of the homogeneous medium. In particular, FIG. 5A shows the image reconstructed without the above-referenced constraints in which $\alpha_1 = \alpha_2 = 0.7$. In contrast, FIG. 5B shows the improved image that was reconstructed with such constraints, in which $\alpha_1=0.7$ and $\alpha_2=0.04$. As can be clearly seen in FIGS. 5A and 5B, the image of FIG. 5B has an improved resolution and contrast in comparison with the image of FIG. 5A.

Figure 6:
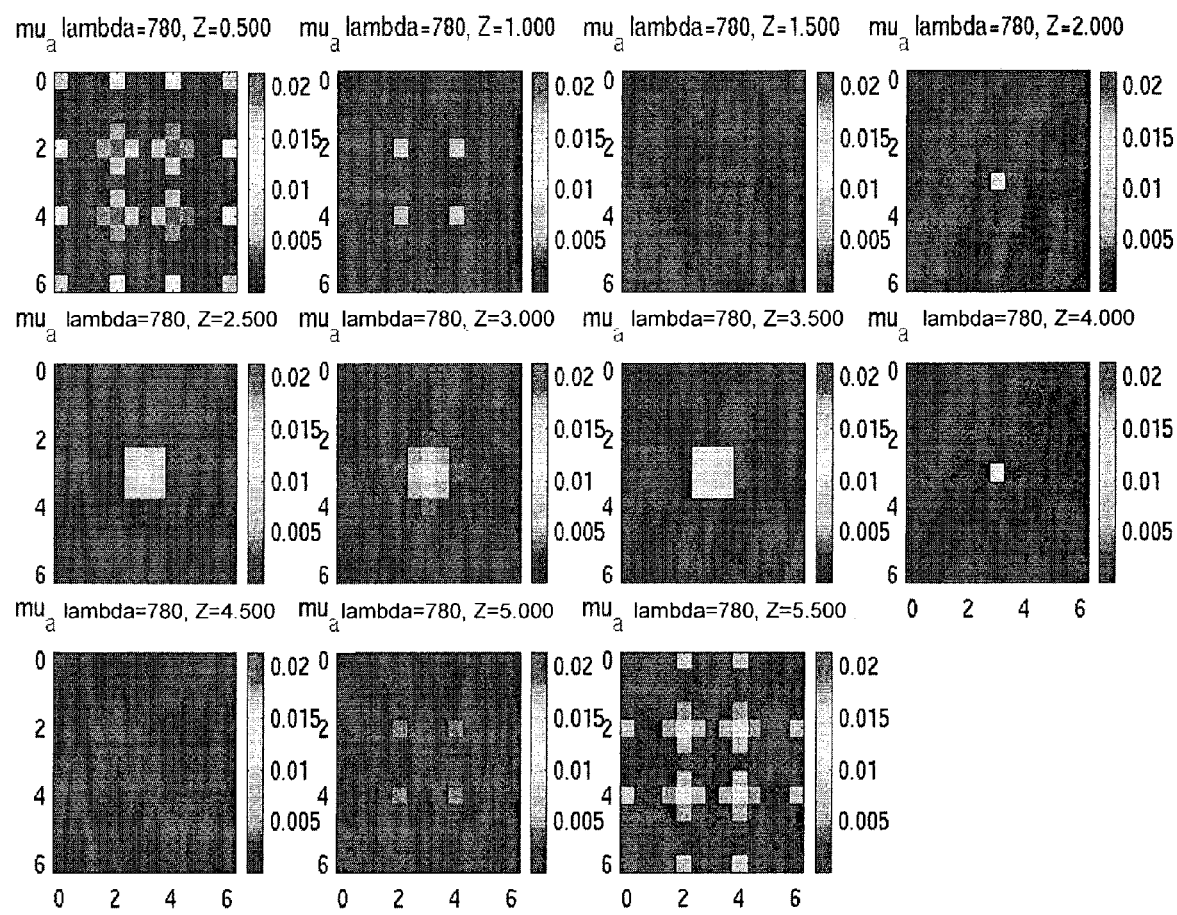
FIG. 6 is an image generated by implementing a Born approximation formulation on the image illustrated in FIG. 5B.

Then, during step 120 of the method shown in FIG. 4A, a Born approximation formulation can be inserted into the implementation and generation of the images. In particular, by utilizing such formulation, the additive noise that propagates to the reconstruction can be calculated using the equation minimization of the cost function $\phi$ described herein above. Using the Born approximation formulation, the "y" value in the equation minimization formula can be replaced by the noise standard deviation ("STD") added into the data. The resultant modified image of such replacement of the "y" value is shown in FIG. 6. As illustrated in this modified image, the region thereof regularized by $\alpha_2$ has a higher noise STD, thus indicating that these pixels are more sensitive to the high frequency noise.

It is also possible to introduce a number of values into this formulation to quantitatively examine the effect of regularization parameters $\alpha_2$ on the quality of the reconstruction. For example, the following quantities can be introduced as described below:

Contrast 1: the ratio of the mean of the object and noise STD outside the interested area, and Contrast 2: the ratio of the mean of the object and noise STD inside the interested area.

Figure 7:
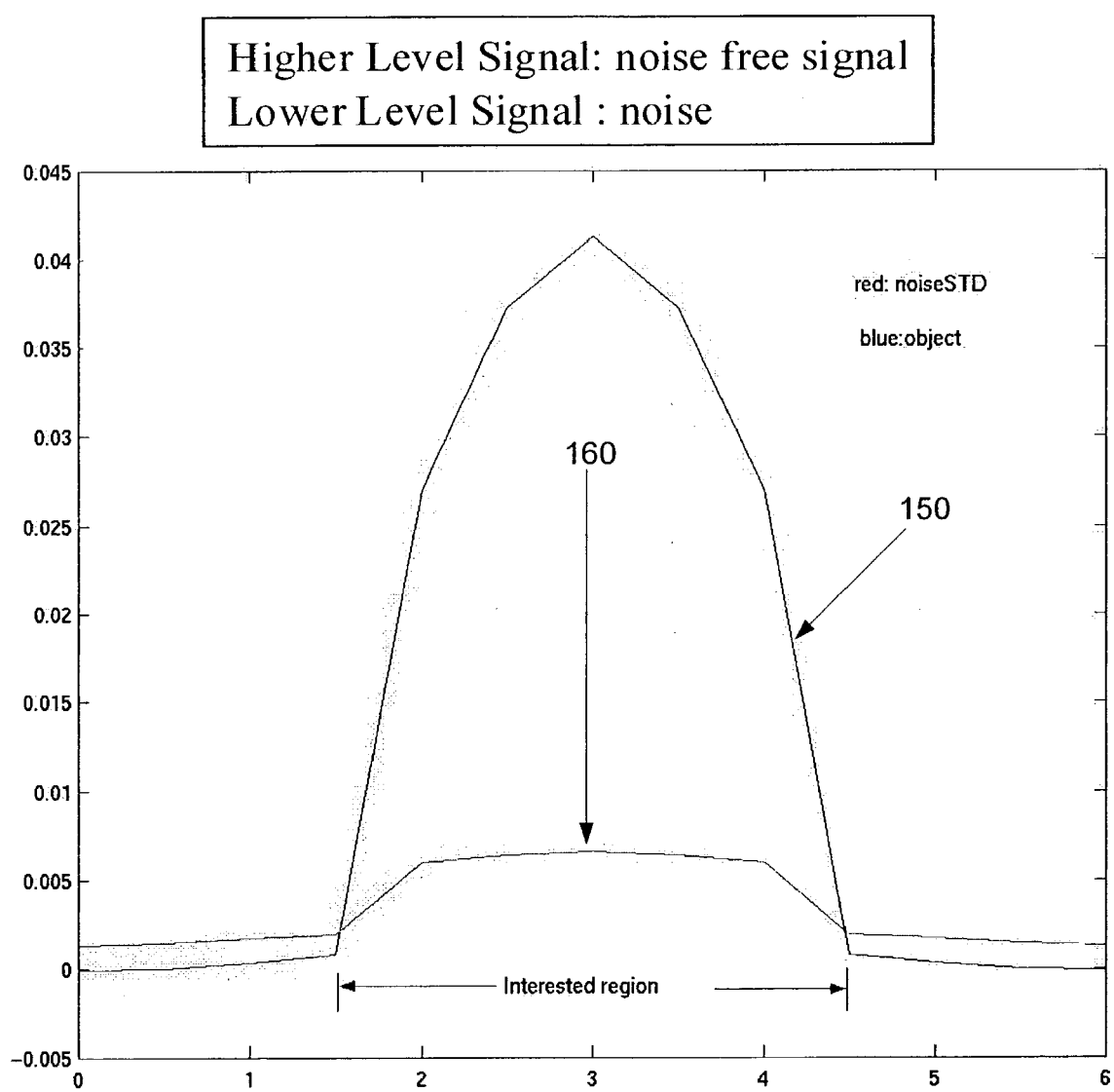
FIG. 7 is a graphic illustration of a two-dimensional image acquired by a line sampling along the X direction.

FIG. 7 shows a one-dimensional presentation of the two-dimensional image acquired by a line sampling along the X direction. The higher level curve 150 indicates the amplitude of the noise free signal (contrast), and the lower level curve 160 indicates the amplitude of noise. A relatively good image requires both high Contrast 1 (e.g., a ratio of the noise free signal inside the interested region to noise outside the interested region) and high Contrast 2 (e.g., a ratio of the noise free signal inside the interested region to noise inside the interested region). Changing the regularization parameters ($\alpha_1, \alpha_2$) can affect Contrast 1 and Contrast 2 differently, and an appropriate regularization may optimize Contrast 1 and Contrast 2 as a whole.

Figure 8A:
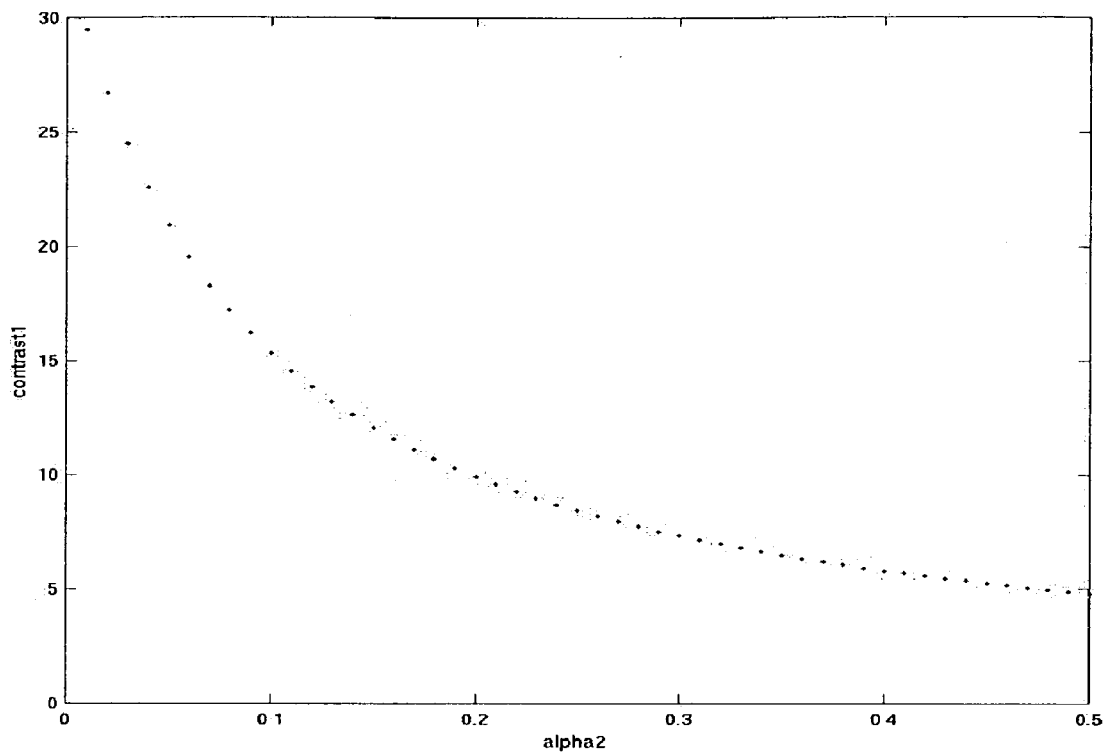
FIG. 8A is a graphical illustration of a relationship between the exemplary quantities of FIG. 7 quantities and a regularization parameter $\alpha_2$ (given another regularization parameter $\alpha_1$).
Figure 8B:
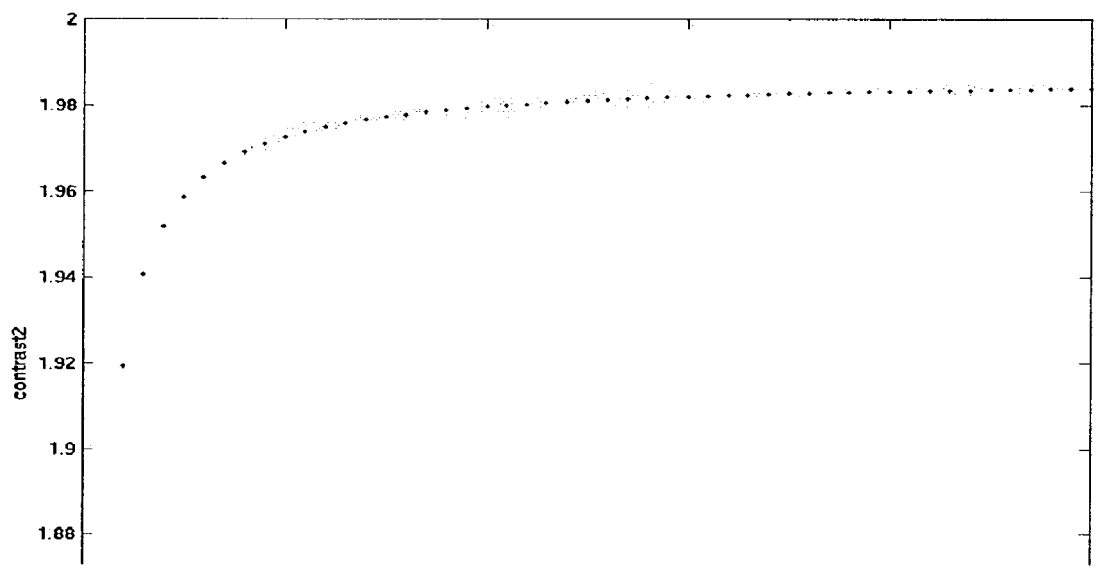
FIG. 8B is a graphical illustration of a relationship between the exemplary quantities of FIG. 7 quantities and $\alpha_2$ (given $\alpha_1$).
Figure 11:
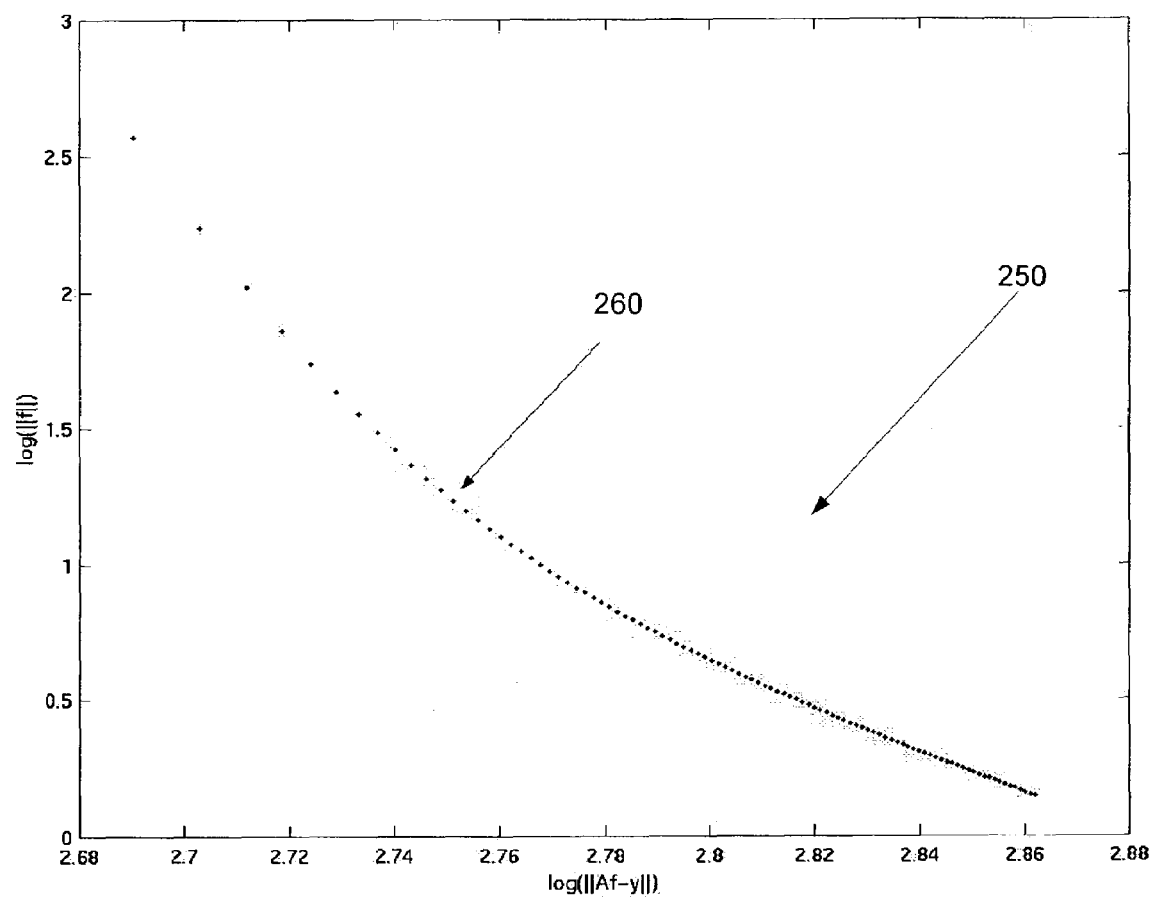
FIG. 11 is an exemplary graph for an L-curve which may used to select an optimal regulation parameter.

FIGS. 8A and 8B illustrate the exemplary relationship between such quantities, i.e., Contrast 1, Contrast 2 and $\alpha_2$ (given $\alpha_1$), respectively. As shown in these figures, Contrast 1 decreases monotonically as $\alpha_2$ increases (see FIG. 8A), and Contrast 2 tends to increase as $\alpha_2$ increases (see FIG. 8B). Although a smaller $\alpha_2$ provides a higher Contrast 1, Contrast 2 is more likely to be contaminated by the noise inside the interested region (e.g., the X-ray region). According to the present invention, is preferable to select an optimized $\alpha_2$ as a balance between these two competing factors. It is also preferable to determine $\alpha_1$ prior to the determination of the optimized $\alpha_2$. In particular, the entire region can be assigned to one parameter, e.g., $\alpha_1$. In this example, an L-curve technique can be utilized, as shown in FIG. 11, and as shall be described in further detail below.

Figure 9A:
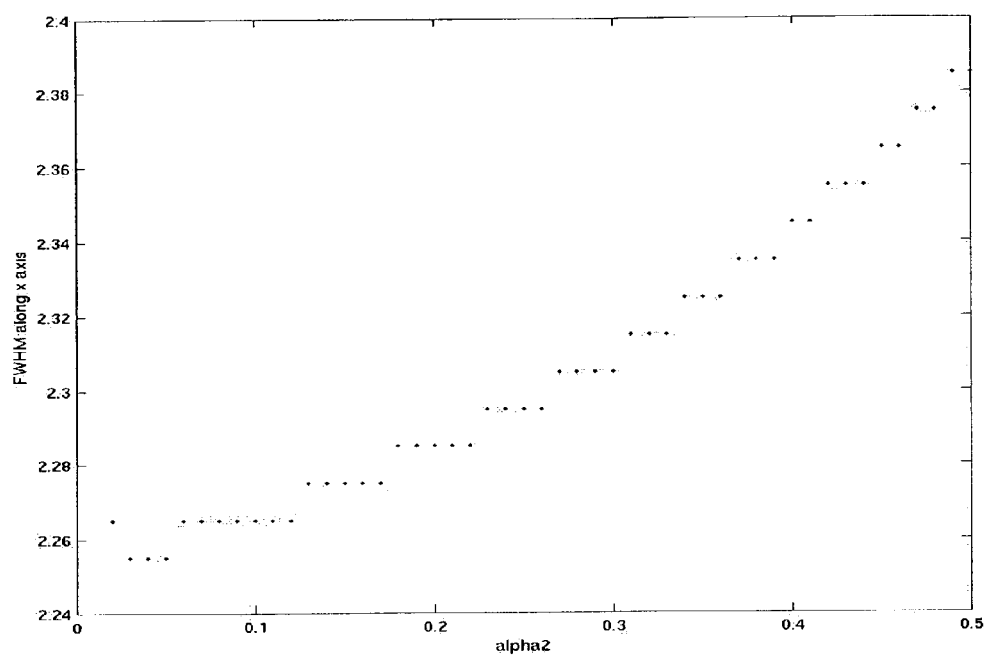
FIG. 9A is a graphical illustration of indicating resolution of the images with respect to $\alpha_2$ along the x-direction.
Figure 9B:
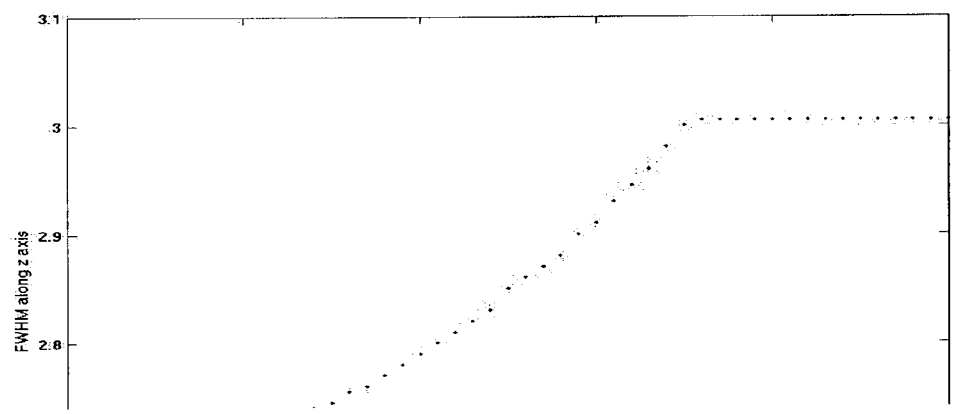
FIG. 9B is a graphical illustration of a resolution of the images with respect to $\alpha_2$ along the z-direction.

In addition to Contrast 1 and Contrast 2, another quantity which can be used to describe the quality of the image is the resolution of the image. In particular, FIGS. 9A and 9B illustrate graphs which indicate that the resolution of the images worsens as $\alpha_2$ increases (e.g., the resolution changes at different regularization parameters). The parameter has a much more significant effect on the resolution in the z direction in (as shown in FIG. 9B) than on the resolution in the x, y direction.

Figure 10:
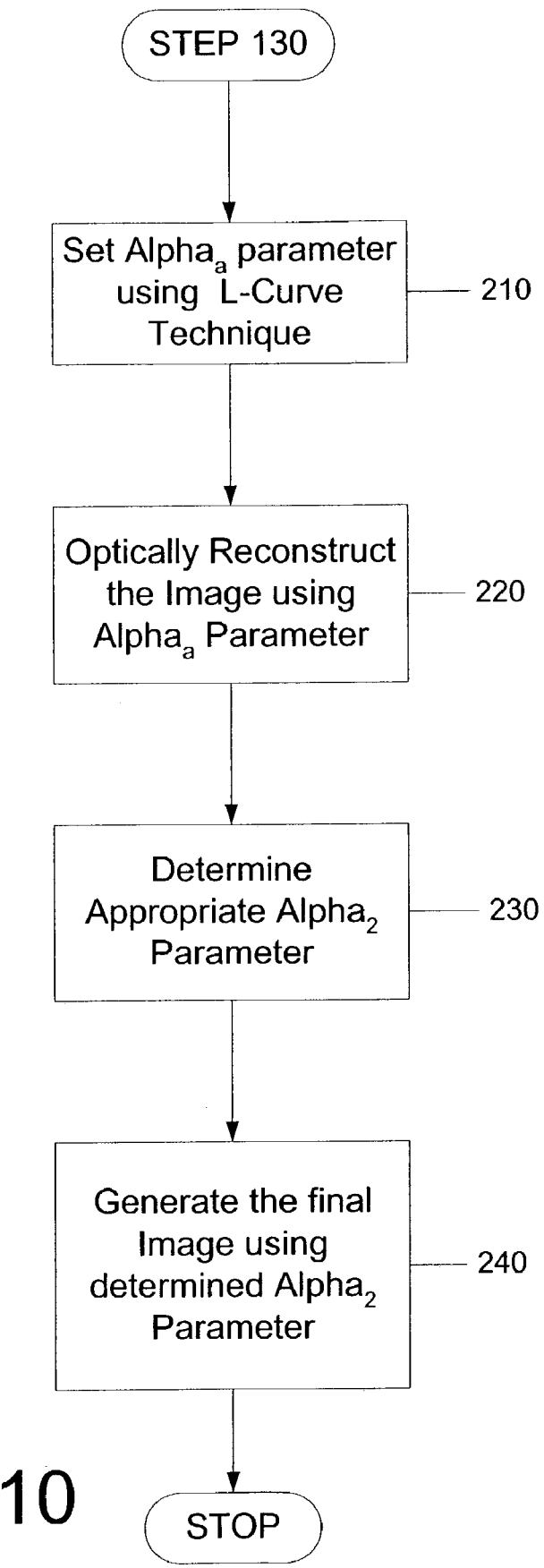
FIG. 10 is a detailed flow diagram of a method according to the present invention to determine the optimized regularization parameters as illustrated in FIG. 4A.

Thereafter, it is preferable to execute an exemplary procedure to determine the optimized regularization parameters to be used, as shown in step 130 of the method illustrated in FIG. 4A. The details of this exemplary procedure is shown in FIG. 10. Particularly, step 210 shown in FIG. 10 indicates that an L-curve technique can be utilized to set $\alpha_a$. In one exemplary embodiment of the present invention, the value of $\alpha_2$ can be substantially the same as that of $\alpha_1$, thus being substantially similar or equal to a Tiknov regularization technique, at least at this stage. An exemplary graph for the L-curve 250 used by the system and process according to the present invention is illustrated in FIG. 11. Indeed, the L-curve technique is a posterior method which uses only the measurement and the forward model that is illustrated in FIG. 4B. Such forward model can be applied to select the regularization parameter which controls the trade-off between the fidelity to the data and a particular constraint on the result. In FIG. 11, an L-point 260 or the L-curve 250 is provided as an optimized value of $\alpha_1$. Once $\alpha_1$ is selected, it is possible to impose $\alpha_2$ into the interested region.

Figure 12:
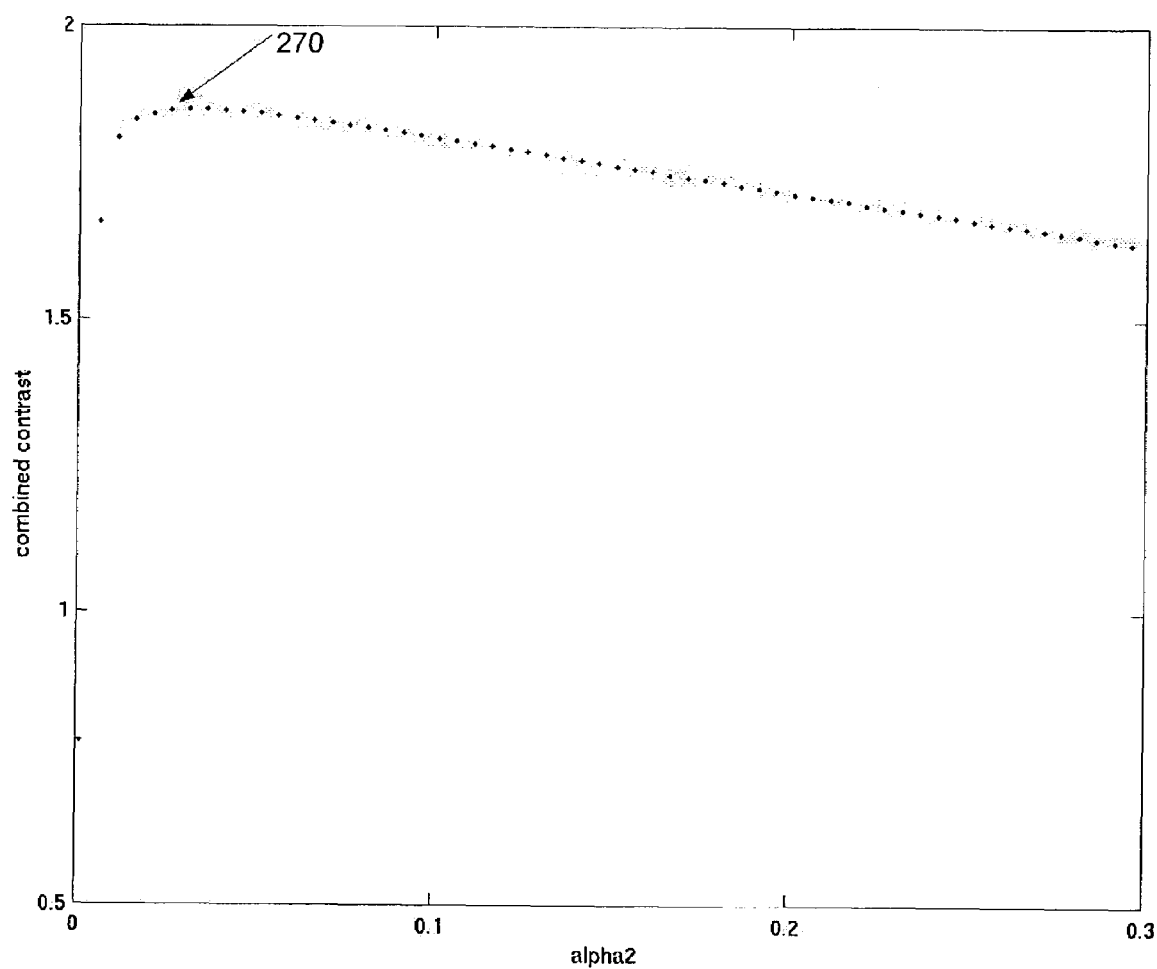
FIG. 12 is an exemplary graph of a combined contrast versus parameter selections to determine an appropriate parameter for image reconstruction.

In step 220 of the procedure of FIG. 10, the image can then be optically reconstructed using this $\alpha_a$ parameter. Then, in step 230, an appropriate $\alpha_2$ parameter is determined which can be used for imposing the x-ray constraint. In particular, it is preferably to ascertain such $\alpha_2$ parameter by compromising between two competing factors: (a) high resolution and contrast, and (b) increasing high frequency noise. This procedure can be performed by plotting a graph 250 of e.g., (contrast $1^{-1}$+contrast $2^{-1})^{-1}$ vs. $\alpha_2$, as illustrated in FIG. 12. The $\alpha_2$ that maximizes the function may be a preferable choice for reconstructing the final image according to the present invention. Thereafter, in step 240, the final image can be generated using the determined $\alpha_2$ parameter (e.g., the soft constraint).

Figure 13:
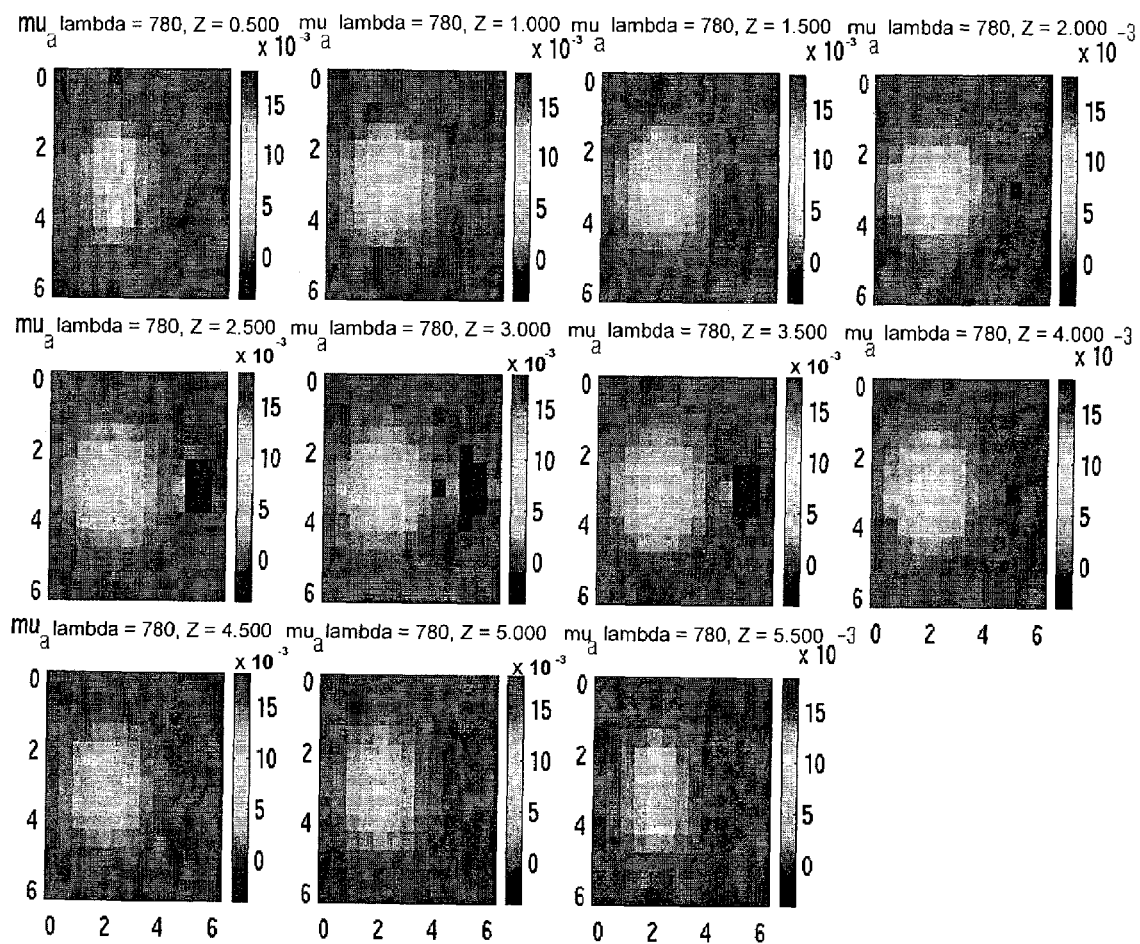
FIG. 13 is an illustration of a reconstruction imposed by an uncorrelated x-ray constraint.
Figure 14:
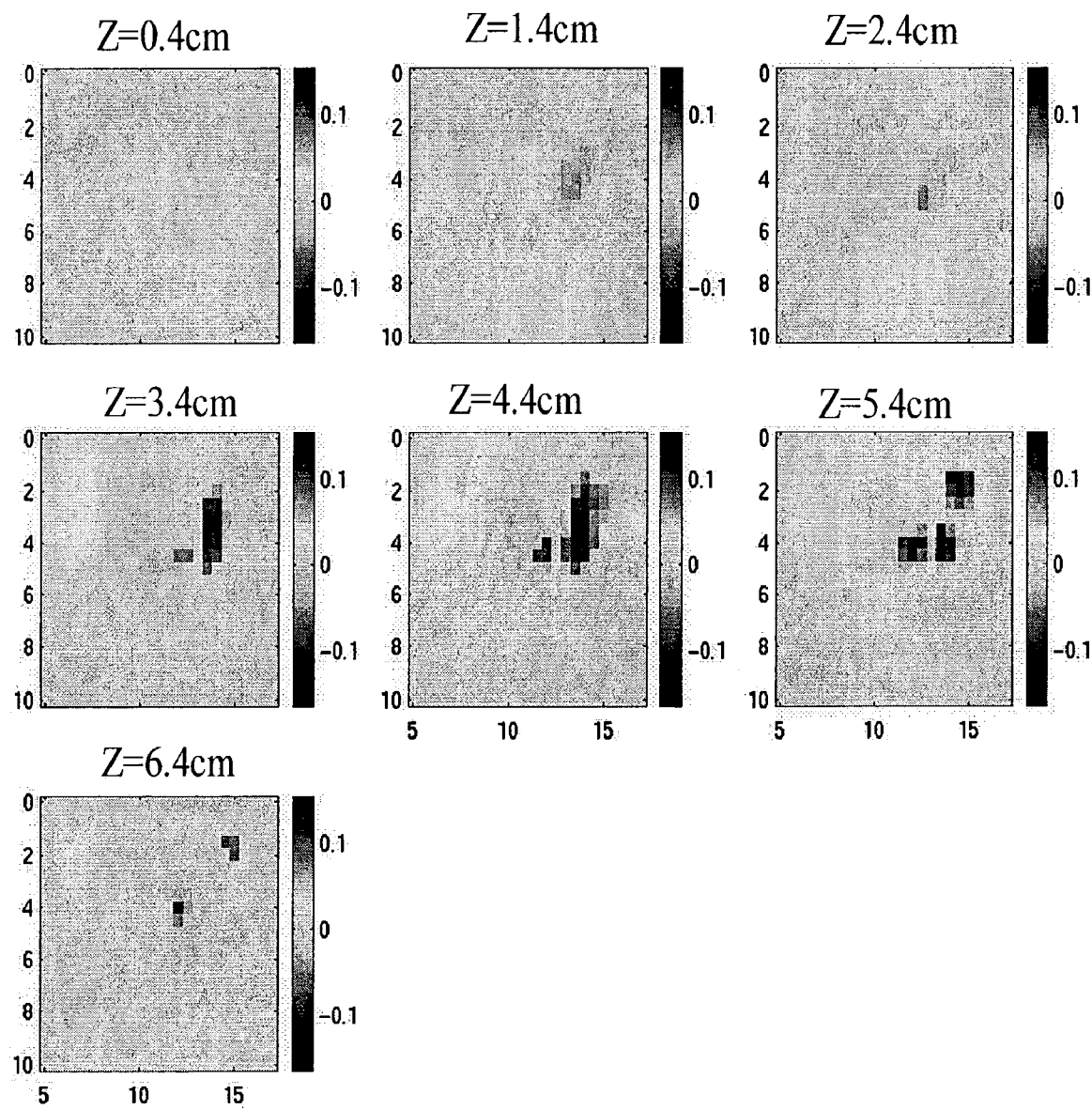
FIG. 14 is an illustration of the resultant images generated using the soft constraint.

The effects of the artifacts generated by the X-ray constraint can also be reduced with a low-pass filter. It is possible that the optical and X-ray constraints are uncorrelated. FIG. 13 shows a reconstruction imposed by an uncorrelated X-ray constraint. In these illustrations of FIG. 13, the imposed 3-dimensional X-ray image is uncorrelated with the optical heterogeneity. For example, the centers are 3 cm off from one another, while both have a 1 cm radius. The artifacts may be due to high frequency noise, which can be filtered out with an appropriate low-pass filter.

II. Detailed Description of Exemplary Embodiments of the Present Invention

Figure 15A:
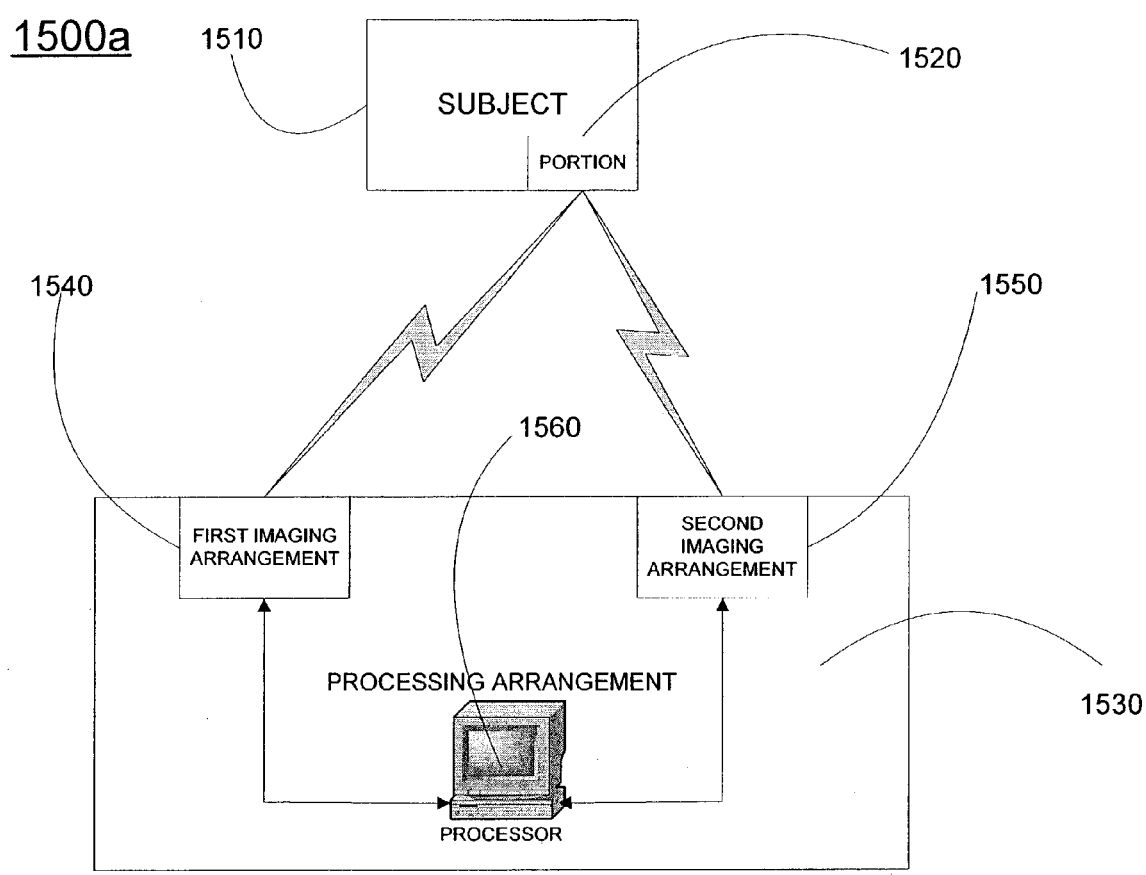
FIG. 15A is a block diagram of a first exemplary embodiment of the system according to the present invention for generating the resultant image.

FIG. 15A shows, a block diagram of a first exemplary embodiment of a system 1500a according to the present invention for generating a resultant image. The system 1500a may include a processing arrangement 1530. The processing arrangement 1530 may be configured to obtain a first image (e.g., an optical diffuse image) and a second image (e.g., an X-ray image, a magnetic resonance image, a functional magnetic resonance image, a computed tomography image, an ultrasound image, etc.) of a subject 1510 (e.g., a human, an animal, etc.) or of a portion 1520 of the subject 1510. For example, the processing arrangement 1530 can simultaneously or sequentially obtain the first and the second images. The processing arrangement 1530 can include a first imaging arrangement 1540 (e.g., a video card), a second processing arrangement 1550 (e.g., a video card), and a processor 1560. For example, the first imaging arrangement 1540 can obtain the first image, and the second imaging arrangement 1550 can obtain the second image.

The first image may include a first portion of the portion 1520 of the subject 1510 as well as a second portion of the portion 1520 of the subject 1510. Moreover, the processing arrangement 1530 (e.g., the processor 1560 of the processing arrangement 1530) can use the second image (e.g., data associated therewith the) to determine a first probability that indicates that the first portion has a contrast which is greater than or equal to a predetermined contrast (e.g., a contrast associated with an abnormality within the subject 1510, such as a tumor, a lesion, etc.). The processing arrangement 1530 can also use the second image to determine a second probability that indicates that the second portion has a contrast which is greater than or equal to the predetermined contrast, and the second probability may be greater than the first probability, i.e., a higher probability that the second portion of the first image includes the abnormality. For example, the first probability may be about 0%, and the second probability may be about 100%. As such, the second portion may be the area of interest within the subject 1510. Moreover, the processing arrangement 1530 can use the first and second portions of the first image to reconstruct the first image, thereby generating the resultant image.

For example, the processing arrangement 1530 can reconstruct the first portion based on the first probability to generate a reconstructed first portion of the resultant image, and the processing arrangement 1530 can also reconstruct the second portion based on the second probability to generate a reconstructed second portion of the resultant image. When the first probability is about 0%, the resolution of the reconstructed first portion of the resultant image may be substantially the same as the resolution of the first portion of the first image. This is because the first portion of the first image does not include any area of interest (e.g., does not include the abnormality). When the second probability is about 100%, the resolution of the reconstructed second portion of the resultant image may be greater than the resolution of the second portion of the second image.

In a variant of this exemplary embodiment of the present invention, the first image can also include a third portion of the subject 1520. For example, the third portion can separate the first portion from the second portion. The third portion can be an outer edge of the abnormality within the subject 1510, and may be subdivided into a plurality of third portions. In this variant, the processing arrangement 1510 can use the second image to determine a third probability indicating that the third portion has a contrast which is greater than or equal to the predetermined contrast. In particular, the third probability may be less than the second probability and greater than the first probability. When the third portion is subdivided into a plurality of third portions, its is possible that each of the third portions may have a different third probability. Nevertheless, each of the third probabilities may be less than the second probability and greater than the first probability.

For example, when a distance between a particular point within the first image and a center of the abnormality is less than or equal to a first predetermined distance, the probability that the particular point includes the abnormality may be 100%. In are exemplary embodiment of the present invention, the first portion of the first image may include all or substantially all of these particular points, and the first probability may be 100%. When the distance between an intermediate point within the first image and the center of the abnormality is greater than the first predetermined distance but is less than or equal to a second predetermined distance, the probability that the particular point includes the abnormality may be greater than 0% but less than 100%. In another exemplary embodiment of the present invention, the third portion of the first image may include all or substantially all of these intermediate points within the first image, and the third probability may be greater than 0% but less than 100%. For example, the third portion may include the outer edge of the abnormality, and the third probability associated with each of the intermediate points within the third portion may vary depending on the location of the intermediate point within the third portion.

In particular, the intermediate points which are closest to the center of the abnormality may have an associated third probability equal to 100%–X %, where X is a percentage greater than 0% but less than 50%, and the intermediate points which are closet to the outer edge of the abnormality may have an associated third probability equal to 0%+X %. Moreover, the intermediate points which are positioned between the intermediate points closest to the center of the abnormality and the intermediate points closest to the outer edge may have an associated third probability which is greater than 0%+X % but less than 100%–X %, depending on their exact location within the third portion. When a distance between a further point within the first image and the center of the abnormality is greater than the first and second predetermined distances, the probability that the further point includes the abnormality may be 0%. In a further exemplary embodiment, the second portion of the first image may include all or substantially all of these further points, and the second probability may be 0%.

In still another exemplary embodiment of the present invention, the reconstruction of the first portion of the first image based on the first probability may include a selection of one or more first regulation parameters $\alpha_1$ associated with the first probability. For example, the first regulation parameter(s) $\alpha_1$ may be associated with an optical absorption of the first portion of the first image, and/or an optical scattering of the first portion of the first image. Similarly, the reconstruction of the second portion of the first image based on the second probability may include a selection of one or more second regulation parameters $\alpha_2$ associated with the second probability. For example, the second regulation parameter(s) $\alpha_2$ may be associated with an optical absorption of the second portion of the first image, and/or an optical scattering of the second portion of the first image.

In particular, the first regulation parameter(s) $\alpha_1$ can control the reconstruction of the first portion, the second regulation parameter(s) $\alpha_2$ can control the reconstruction of the second portion, and the second regulation parameter may be less than or equal to the first regulation parameter. For example, a normalized value of the first regulation parameter(s) $\alpha_1$ may be between about 0.1 and about 1, and a normalized value of the second regulation parameter(s) $\alpha_2$ can be greater than zero and less than or equal to about 0.1. As described above in the Theory Section, the normalized value for the first regulation parameter(s) $\alpha_1$ may be selected using a L-curve procedure. Moreover, after the normalized value for the first regulation parameter(s) $\alpha_1$ is selected, the normalized value for the second regulation parameter(s) $\alpha_2$ can be selected by balancing two inversely related factors. In particular, the such first factor may be the resolution of the reconstructed second portion of the resultant image, and the second such factor may be an amount of noise generated in the reconstructed second portion of the resultant image. For example, increasing the second regulation parameter(s) $\alpha_2$ decreases the amount of noise generated in the reconstructed second portion, and also decreases the resolution of the reconstructed second portion. Similarly, decreasing the second regulation parameter(s) $\alpha_2$ increases the resolution of the reconstructed second portion, and also increases the amount of noise generated in the reconstructed second portion. By balancing these two factors, an optimum normalized value for second regulation parameter(s) $\alpha_2$ may be selected and the objective function can then be minimized.

Figure 15B:
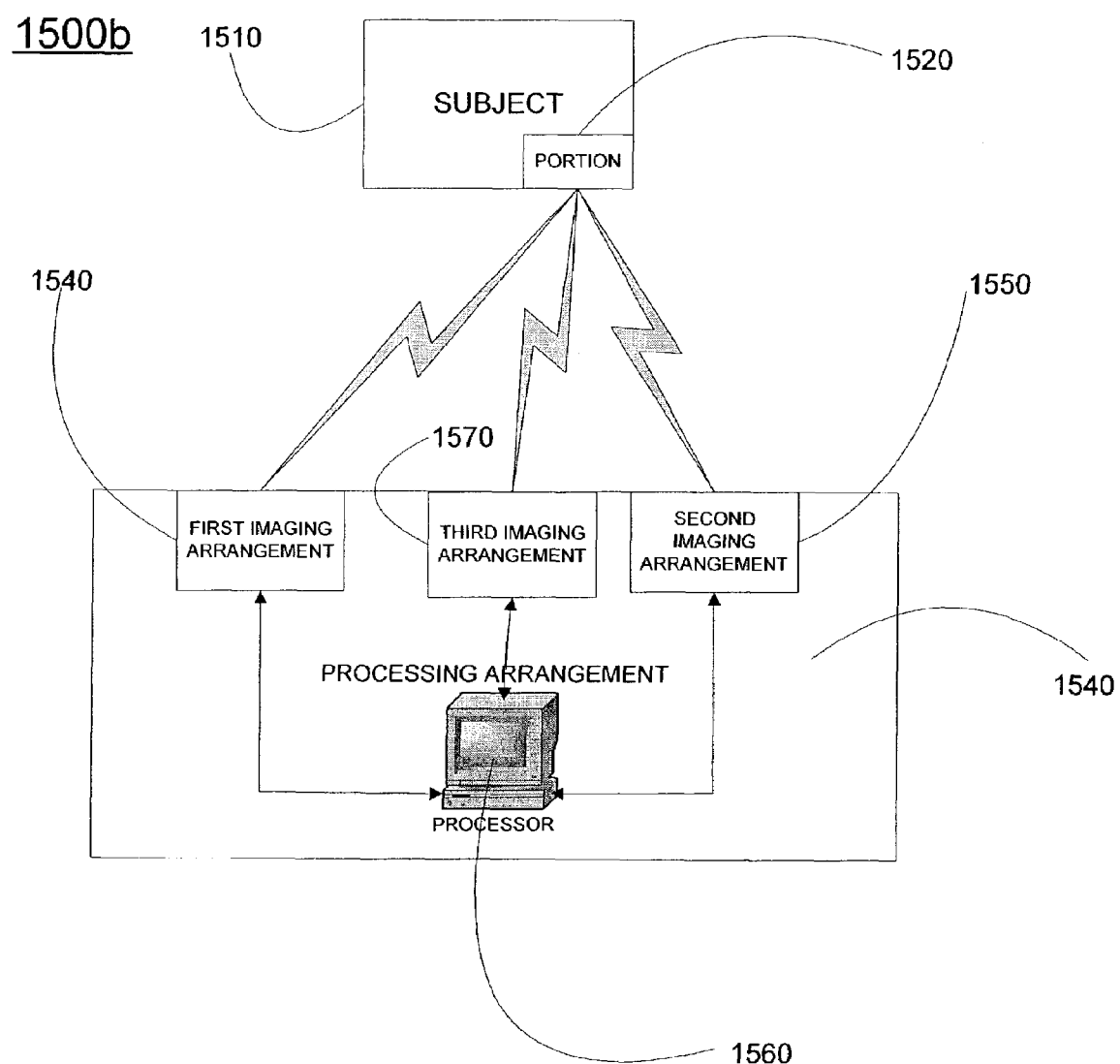
FIG. 15B is a block diagram of a second exemplary embodiment of the system according to the present invention for generating the resultant image.

FIG. 15B shows, a block diagram of a second exemplary embodiment of a system 1500b according to the present invention for generating a resultant image which includes a processing arrangement 1540. The features and advantages of the system 1500b are substantially the same as the features and advantages of the system 1500a. Therefore, the similar features and advantages of system 1500a and system 1500b are not discussed further with respect to system 1500b. For example, the processing arrangement 1530 may obtain an optical diffuse image, a magnetic resonance image, and a functional magnetic resonance image of the subject 1510 or the portion 1520 of the subject 1510. Moreover, the processing arrangement 1540 can use the second image and the third image to determine the first probability indicating that the first portion of the optical diffuse image has a contrast which is greater than or equal to the predetermined contrast. The processing arrangement 1540 can also use the second image and the third image to determine the second probability indicating that the second portion of the optical diffuse image has a contrast which is greater than or equal to the predetermined contrast, and the second probability is greater than the first probability. Moreover, the processing arrangement uses the first and second portions of the first image to reconstruct the first image, thereby generating the resultant image. In particular, the processing arrangement 1540 reconstructs the first portion based on the first probability to generate the reconstructed first portion of the resultant image. The processing arrangement 1540 can also reconstruct the second portion based on the second probability to generate the reconstructed second portion of the resultant image.

After the resultant image is generated, the resultant image may be used to determine each of a rate of a flow of blood within the abnormality, a volume of the blood within the abnormality, and a deoxyhemoglobin concentration within the abnormality. Based on the data associated with the flow of the blood, the volume of the blood, and the deoxyhemoglobin concentration within the abnormality, the amount of oxygen consumed by the abnormality then may be determined using any known technique for determining oxygen consumption.

Figure 16C:
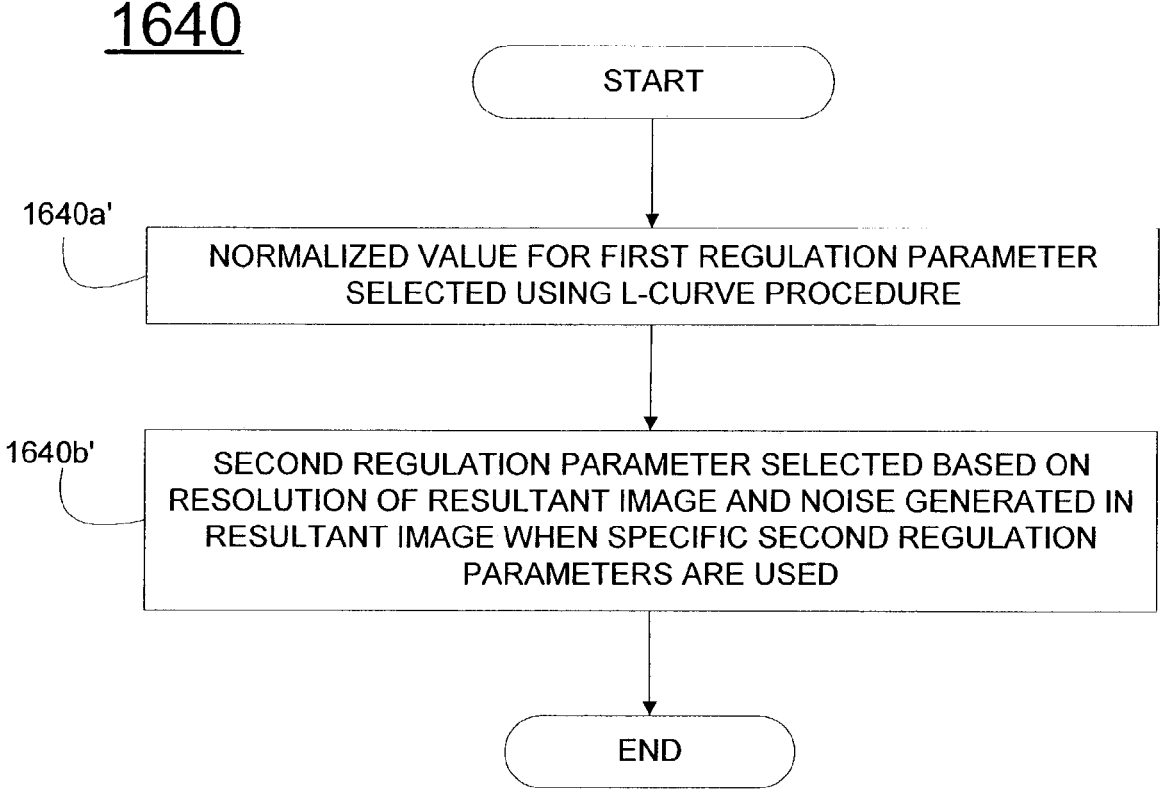
FIG. 16C is a flowchart of another variant of the method of FIG. 16B.

FIG. 16A shows, a flowchart of a second exemplary embodiment of a method according to the present invention for generating the resultant image. In step 1610, the first and second images are obtained with the first image including the first portion of the subject and the second portion of the subject. The first and second images can be different image types. In steps 1620 and 1630, the first and second probabilities described _____ can be determined, respectively. Moreover, in step 1640, the first and second portions of the first image are reconstructed based on the first and second probabilities, respectively, to generate the resultant image. For example, referring to FIG. 16B which shows the exemplary details of step 1640, step 1640a provide that the first regularization parameter $\alpha_1$ is selected, and step 1640b provides that, the second regularization parameter $\alpha_2$ is selected. FIG. 16C shows exemplary details of step 1640, step 1640a' provides that the first regularization parameter $\alpha_1$ is selected using the L-Curve procedure, and step 1640b provides that, the second regularization parameter $\alpha_2$ is selected by balancing the resolution of the second portion of the resultant image and the noise generated in the second portion of the resultant image.

FIG. 17 shows a flowchart of a third exemplary embodiment of the method according to the present invention for generating the resultant image is depicted. In step 1710, the first and second images are obtained, and in steps 1720, 1730, and 1740 the first, second, and third probabilities are determined, respectively. For example, the third probability may include a plurality of third probabilities, and each of the third probabilities may correspond to one of the third portions of the first image. Moreover, in step 1750, the first, second, and at least one third portions of the first image are reconstructed based on the first, second, and third probabilities, respectively, to generate the resultant image.

FIG. 18 illustrates a flowchart of a fourth exemplary embodiment of the method according to the present invention for generating the resultant image is depicted. In step 1810, the diffuse optical image, the magnetic resonance image, and the functional magnetic resonance image are obtained. Specifically, the diffuse optical image includes the first portion and the second portion. In steps 1820 and 1830, the first and second probabilities are determined, respectively. Moreover, in step 1840, the first and second portions of the diffuse optical image are reconstructed based on the first and second probabilities, respectively, to generate the resultant diffuse optical image. Then, in step 1850, the rate of flow of blood, the volume of the blood, and the deoxyhemoglobin concentration within the abnormality is determined using the resultant diffuse optical image. Finally, in step 1860, the amount of oxygen consumed by the abnormality is determined based on the data associated with the rate of flow of blood, the volume of the blood, and the deoxyhemoglobin concentration within the abnormality using a known technique.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are consider exemplary only, with the true scope of the invention indicated by the following claims.

What is claimed is:

1. A method generating a resultant image, comprising:
    obtaining first and second images of at least one portion of a subject, wherein the first image comprises a first portion of the at least one portion of the subject and a second portion of the at least one portion of the subject, and wherein each of the first image and the second image are from modalities that are different from one another;
    using the second image, determining each of a first probability that the first portion has a contrast which is greater than or equal to a predetermined contrast and a second probability that the second portion has a contrast which is greater than or equal to the predetermined contrast, wherein the second probability is greater than the first probability; and
    reconstructing the first and second portions of the first image to generate the resultant image, wherein the first portion is reconstructed based on the first probability to generate a reconstructed first portion of the resultant image, and wherein the second portion is reconstructed based on the second probability to generate a reconstructed second portion of the resultant image.

2. The method of claim 1, wherein each of the first image and resultant images is an optical diffuse image.

3. The method of claim 2, wherein the second image is one of an X-ray image, a magnetic resonance image, a functional magnetic resonance image, a computed tomography image, or an ultrasound image.

4. The method of claim 1, wherein the first and second images are obtained simultaneously.

5. The method of claim 4, wherein each of the first image and resultant images is an optical diffuse image, and wherein the second image is one of an X-ray image, a magnetic resonance image, a functional magnetic resonance image, a computed tomography image, or an ultrasound image.

6. The method of claim 1, wherein the first image further comprises at least one third portion of the at least one portion of the subject.

7. The method of claim 1, wherein the predetermined contrast is a contrast associated with an abnormality within the subject.

8. The method of claim 7, wherein the abnormality is one of a lesion or a tumor.

9. The method of claim 1, further comprising the steps of:
obtaining a third image of the at least one portion of the subject, wherein each of the first image, the second image, and the third image are from modalities that are different from one another; and
using the second image and the third image, determining each of the first probability and the second probability.

10. The method of claim 9, wherein each of the first image and the resultant image is an optical diffuse image, wherein the second image is a magnetic resonance image, and wherein the third image is a functional magnetic resonance image.

11. The method of claim 10, wherein each of the first, second, and third images is obtained simultaneously.

12. The method of claim 11, wherein the predetermined contrast is a contrast associated with an abnormality within the subject.

13. A method for generating a resultant image, comprising:
obtaining first and second images of at least one portion of a subject, wherein the first image comprises a first portion of the at least one portion of the subject and a second portion of the at least one portion of the subject, and wherein each of the first image and the second image are from modalities that are different from one another types of images;
using the second image, determining each of a first probability that the first portion has a contrast which is greater than or equal to a predetermined contrast and a second probability that the second portion has a contrast which is greater than or equal to the predetermined contrast, wherein the second probability is greater than the first probability; and
reconstructing the first and second portions of the first image to generate the resultant image,
wherein the first portion is reconstructed based on the first probability to generate a reconstructed first portion of the resultant image, wherein the second portion is reconstructed based on the second probability to generate a reconstructed second portion of the resultant image, wherein the reconstructing step comprises the substep of selecting each of at least one first regulation parameter which is associated with the first probability and at least one second regulation parameter which is associated with the second probability, wherein the at least one first regulation parameter controls the reconstruction of the first portion, wherein the at least one second regulation parameter controls the reconstruction of the second portion, and wherein the at least one second regulation parameter is less than or equal to the at least one first regulation parameter.

14. The method of claim 13, wherein the at least one first regulation parameter has a particular normalized value which is between about 0.1 and about 1, and wherein the at least one second regulation parameter has a further normalized value which is greater than zero and less than or equal to about 0.1.

15. The method of claim 13, wherein the selecting step comprises the substeps of:
selecting a first normalized value for the at least one first regulation parameter using a L-curve procedure; and
selecting a second normalized value for the at least one second regulation parameter based on each of a resolution of the reconstructed second portion associated with the second normalized value, and an amount of noise generated in the reconstructed second portion associated with the second normalized value.

16. The method of claim 13, wherein each of the at least one first regulation parameter and the at least one second regulation parameter is associated with at least one of an optical absorption or an optical scattering of the respective first and second portions.

17. The method of claim 13, wherein the at least one second regulation parameter comprises a particular second regulation parameter and a further second regulation parameter, wherein the particular second regulation parameter is associated with an optical absorption of the second portion, and wherein the further second regulation parameter is associated with an optical scattering of the second portion.

18. The method of claim 17, wherein the at least one first regulation parameter comprises a particular first regulation parameter and a further first regulation parameter, wherein the particular first regulation parameter is associated with an optical absorption of the first portion, and wherein the further first regulation parameter is associated with an optical scattering of the first portion.

19. A method for generating a resultant image, comprising:
obtaining first and second images of at least one portion of a subject, wherein the first image comprises a first portion of the at least one portion of the subject and a second portion of the at least one portion of the subject, and wherein each of the first image and the second image are from modalities that are different from one another types of images;
using the second image, determining each of a first probability that the first portion has a contrast which is greater than or equal to a predetermined contrast and a second probability that the second portion has a contrast which is greater than or equal to the predetermined contrast, wherein the second probability is greater than the first probability;
reconstructing the first and second portions of the first image to generate the resultant image, wherein the first portion is reconstructed based on the first probability to generate a reconstructed first portion of the resultant image, wherein the second portion is reconstructed based on the second probability to generate a reconstructed second portion of the resultant image, and wherein the first image further comprises at least one third portion of the at least one portion of the subject; and
using the second image, determining at least one third probability indicating that that the at least one third portion has a contrast which is greater than the predetermined contrast, wherein the at least one third probability is greater than the first probability and smaller than the second probability.

20. The method of claim 19, wherein the first portion and the second portion are separated by the third portion.

21. A method for generating a resultant image, comprising:
obtaining first and second images of at least one portion of a subject, wherein the first image comprises a first portion of the at least one portion of the subject and a second portion of the at least one portion of the subject, and wherein each of the first image and the second image are from modalities that are different from one another types of images;
using the second image, determining each of a first probability that the first portion has a contrast which is greater than or equal to a predetermined contrast and a second probability that the second portion has a contrast which is greater than or equal to the predetermined contrast, wherein the second probability is greater than the first probability, wherein the predetermined contrast is a contrast associated with an abnormality within the subject;
reconstructing the first and second portions of the first image to generate the resultant image, wherein the first portion is reconstructed based on the first probability to generate a reconstructed first portion of the resultant image, wherein the second portion is reconstructed based on the second probability to generate a reconstructed second portion of the resultant image;
using the resultant image, determining a rate of a flow of blood within the abnormality;
using the resultant image, determining a volume of the blood within the abnormality; and
using the resultant image, determining a deoxyhemoglobin concentration within the abnormality.

22. The method of claim 21, further comprising the step of determining an amount of oxygen consumed by the abnormality based on each of the flow of the blood, the volume of the blood, and the deoxyhemoglobin concentration within the abnormality.

23. The method of claim 22, wherein the abnormality is one of a lesion or a tumor.

24. A system for generating a resultant image, comprising:
a processing arrangement configured to:
obtain a first and second images of at least one portion of a subject, wherein the first image comprises a first portion of the at least one portion of the subject and a second portion of the at least one portion of the subject, and wherein each of the first image and the second image are from modalities that are different from one another;
using the second image, determine each of a first probability that the first portion has a contrast which is greater than or equal to a predetermined contrast and a second probability that the second portion has a contrast which is greater than or equal to the predetermined contrast, wherein the second probability is greater than the first probability; and
reconstruct the first and second portions of the first image to generate the resultant image, wherein the first portion is reconstructed based on the first probability to generate a reconstructed first portion of the resultant image, and wherein the second portion is reconstructed based on the second probability to generate a reconstructed second portion of the resultant image.

25. The system of claim 24, wherein the processing arrangement comprises:
a first imaging arrangement configured to obtain the first image;
a second imaging arrangement configured to obtain the second image; and
a processor configured to reconstruction the first and second portions.

26. The system of claim 25, wherein the first imaging arrangement is an optical diffuse imaging arrangement, and wherein the second imaging arrangement is one of an X-ray imaging arrangement, a magnetic resonance imaging arrangement, a functional magnetic resonance imaging arrangement, a computed tomography imaging arrangement or an ultrasound imaging arrangement.

27. The system of claim 25, wherein the processing arrangement is further configured to:
obtain a third image of the at least one portion of the subject, wherein each of the first, the second, and the third images are from modalities that are different from one another; and
using the second and third images, determine each of the first probability and the second probability.

28. The system of claim 27, wherein the processing arrangement further comprises a third imaging arrangement configured to obtain the third image, wherein the first imaging arrangement is an optical diffuse imaging arrangement, wherein the second imaging arrangement is a magnetic resonance imaging arrangement, and wherein the third imaging arrangement is a functional magnetic resonance imaging arrangement.

29. The system of claim 28, wherein each of the first, second, and third images are obtained simultaneously.

30. The system of claim 29, wherein the predetermined contrast is a contrast associated with an abnormality within the subject.

31. The system of claim 24, wherein the first image and the second image are obtained simultaneously.

32. The system of claim 31, wherein the first imaging arrangement is an optical diffuse imaging arrangement, and wherein the second imaging arrangement is one of an X-ray imaging arrangement, a magnetic resonance imaging arrangement, a functional magnetic resonance imaging arrangement, a computed tomography imaging arrangement or an ultrasound imaging arrangement.

33. The system of claim 24, wherein the first image further comprises at least one third portion of the at least one portion of the subject.

34. The system of claim 24, wherein the predetermined contrast is a contrast associated with an abnormality within the subject.

35. The system of claim 34, wherein the abnormality is one of a lesion or a tumor.

36. A system for generating a resultant image, comprising:
a processing arrangement configured to:
obtain a first and second images of at least one portion of a subject, wherein the first image comprises a first portion of the at least one portion of the subject and a second portion of the at least one portion of the subject, and wherein each of the first image and the second image are different types of images;
using the second image, determine each of a first probability that the first portion has a contrast which is greater than or equal to a predetermined contrast and a second probability that the second portion has a contrast which is greater than or equal to the predetermined contrast, wherein the second probability is greater than the first probability;

reconstruct the first and second portions of the first image to generate the resultant image, wherein the first portion is reconstructed based on the first probability to generate a reconstructed first portion of the resultant image, and wherein the second portion is reconstructed based on the second probability to generate a reconstructed second portion of the resultant image; and select each of at least one first regulation parameter which is associated with the first probability and at least one second regulation parameter which is associated with the second probability, wherein the at least one first regulation parameter controls the reconstruction of the first portion, wherein the at least one second regulation parameter controls the reconstruction of the second portion, and wherein the at least one second regulation parameter is less than or equal to the at least one first regulation parameter.

37. The system of claim 36, wherein the at least one first regulation parameter has a particular normalized value which is between about 0.1 and about 1, and wherein the at least one second regulation parameter has a further normalized value which is greater than zero and less than or equal to about 0.1.

38. The system of claim 36, wherein the processing arrangement is further configured to:
select a first normalized value for the at least one first regulation parameter using a L-curve procedure; and
select a second normalized value for the at least one second regulation parameter based on each of a resolution of the reconstructed second portion associated with the second normalized value, and an amount of noise generated in the reconstructed second portion associated with the second normalized value.

39. The system of claim 36, wherein each of the at least one first regulation parameter and the at least one second regulation parameter is associated with at least one of an optical absorption or an optical scattering of the respective first and second portions.

40. The system of claim 36, wherein the at least one second regulation parameter comprises a particular second regulation parameter and a further second regulation parameter, wherein the particular second regulation parameter is associated with an optical absorption of the second portion, and wherein the further second regulation parameter is associated with an optical scattering of the second portion.

41. The system of claim 40, wherein the at least one first regulation parameter comprises a particular first regulation parameter and a further first regulation parameter, wherein the particular first regulation parameter is associated with an optical absorption of the first portion, and wherein the further first regulation parameter is associated with an optical scattering of the first portion.

42. A system for generating a resultant image, comprising:
a processing arrangement configured to:
obtain a first and second images of at least one portion of a subject, wherein the first image comprises a first portion of the at least one portion of the subject and a second portion of the at least one portion of the subject, and wherein each of the first image and the second image are different types of images;
using the second image, determine each of a first probability that the first portion has a contrast which is greater than or equal to a predetermined contrast and a second probability that the second portion has a contrast which is greater than or equal to the predetermined contrast, wherein the second probability is greater than the first probability;
reconstruct the first and second portions of the first image to generate the resultant image, wherein the first portion is reconstructed based on the first probability to generate a reconstructed first portion of the resultant image, wherein the second portion is reconstructed based on the second probability to generate a reconstructed second portion of the resultant image, and wherein the first image further comprises at least one third portion of the at least one portion of the subject; and
use the second image to determine at least one third probability that the at least one third portion has a contrast which is greater than the predetermined contrast, wherein the at least one third probability is greater than the first probability and less than the second probability.

43. The system of claim 42, wherein the first portion and the second portion are separated by the third portion.

44. A system for generating a resultant image, comprising:
a processing arrangement configured to:
obtain a first and second images of at least one portion of a subject, wherein the first image comprises a first portion of the at least one portion of the subject and a second portion of the at least one portion of the subject, and wherein each of the first image and the second image are different types of images;
using the second image, determine each of a first probability that the first portion has a contrast which is greater than or equal to a predetermined contrast and a second probability that the second portion has a contrast which is greater than or equal to the predetermined contrast, wherein the second probability is greater than the first probability, and the predetermined contrast is a contrast associated with an abnormality within the subject;
reconstruct the first and second portions of the first image to generate the resultant image, wherein the first portion is reconstructed based on the first probability to generate a reconstructed first portion of the resultant image, wherein the second portion is reconstructed based on the second probability to generate a reconstructed second portion of the resultant image;
use the resultant image to determine a rate of a flow of blood within the abnormality;
use the resultant image to determine a volume of the blood within the abnormality; and
use the resultant image to determine a deoxyhemoglobin concentration within the abnormality.

45. The system of claim 44, wherein the processing arrangement is further configured to determine an amount of oxygen consumed by the abnormality based on each of the flow of the blood, the volume of the blood, and the deoxyhemoglobin concentration within the abnormality.

46. The system of claim 45, wherein the abnormality is one of a lesion or a tumor.

47. A computer-accessible medium providing thereon a software arrangement which configures a processing arrangement accessing the software arrangement to generate a resultant image, wherein, when executed by the processing arrangement, the software arrangement configures the processing arrangement to perform the procedures comprising:
obtaining a first and second images of at least one portion of a subject, wherein the first image comprises a first portion of the at least one portion of the subject and a second portion of the at least one portion of the subject, and wherein each of the first image and the second image are from modalities that are different from one another;

using the second image, determining each of a first probability that the first portion has a contrast which is greater than or equal to a predetermined contrast and a second probability that the second portion has a contrast which is greater than or equal to the predetermined contrast, wherein the second probability is greater than the first probability; and reconstructing the first and second portions of the first image to generate the resultant image, wherein the first portion is reconstructed based on the first probability to generate a reconstructed first portion of the resultant image, and wherein the second portion is reconstructed based on the second probability to generate a reconstructed second portion of the resultant image.

* * * * *